(12) United States Patent
Yuki et al.

(10) Patent No.: US 7,154,542 B1
(45) Date of Patent: Dec. 26, 2006

(54) IMAGE PICKUP APPARATUS HAVING AN EXPOSURE CONTROL CIRCUIT

(75) Inventors: Osamu Yuki, Atsugi (JP); Seiji Hashimoto, Yokohama (JP)

(73) Assignee: Canon Kabushiki Kaishi, Tokyo (JP)

( * ) Notice: Subject to any disclaimer, the term of this patent is extended or adjusted under 35 U.S.C. 154(b) by 802 days.

(21) Appl. No.: 09/655,862

(22) Filed: Sep. 6, 2000

(30) Foreign Application Priority Data

Sep. 8, 1999 (JP) ............... 11-254745

(51) Int. Cl.
*H04N 5/235* (2006.01)

(52) U.S. Cl. .................. 348/229.1; 348/272

(58) Field of Classification Search ............ 348/302, 348/308, 311, 333.01, 362, 345, 240.99, 221.1, 348/229.1
See application file for complete search history.

(56) References Cited

U.S. PATENT DOCUMENTS

| | | | |
|---|---|---|---|
| 4,768,085 A | 8/1988 | Hashimoto | |
| 4,876,601 A | 10/1989 | Hashimoto et al. | |
| 4,910,597 A | 3/1990 | Harada et al. | |
| 4,910,599 A * | 3/1990 | Hashimoto | 348/240.2 |
| 4,914,519 A | 4/1990 | Hashimoto et al. | |
| 4,967,067 A | 10/1990 | Hashimoto et al. | |
| 4,985,758 A | 1/1991 | Hashimoto | |
| 5,043,817 A * | 8/1991 | Kinugasa et al. | 348/240.2 |
| 5,162,912 A | 11/1992 | Ueno et al. | |
| 5,262,850 A | 11/1993 | Hashimoto | |
| 5,288,988 A | 2/1994 | Hashimoto et al. | |
| 5,315,412 A | 5/1994 | Mihara et al. | |
| 5,424,529 A | 6/1995 | Hashimoto et al. | |
| 5,587,814 A | 12/1996 | Mihara et al. | |
| 5,838,370 A * | 11/1998 | Kaji | 348/240.2 |
| 5,959,670 A * | 9/1999 | Tamura et al. | 348/364 |
| 6,124,891 A * | 9/2000 | Homma et al. | 348/364 |
| 6,597,399 B1 * | 7/2003 | Horii | 348/308 |
| 6,628,328 B1 * | 9/2003 | Yokouchi et al. | 348/221.1 |
| 6,657,668 B1 * | 12/2003 | Hata | 348/349 |
| 6,806,907 B1 * | 10/2004 | Tamura | 348/362 |
| 6,888,568 B1 * | 5/2005 | Neter | 348/222.1 |
| 2004/0201730 A1 * | 10/2004 | Tamura | 348/229.1 |

FOREIGN PATENT DOCUMENTS

JP 62110369 5/1987

* cited by examiner

*Primary Examiner*—Vivek Srivastava
*Assistant Examiner*—Kelly Jerabek
(74) *Attorney, Agent, or Firm*—Fitzpatrick, Cella, Harper & Scinto

(57) ABSTRACT

In order to form a magnified image without degradation of a resolution, signals of pixels contained in a first image pickup area are read through addition of n (n is a natural number) pixels, and signals of pixels contained in a second image pickup area smaller than the first image pickup area are read through addition of m (m<n, m is a natural number) pixels or without addition.

11 Claims, 22 Drawing Sheets

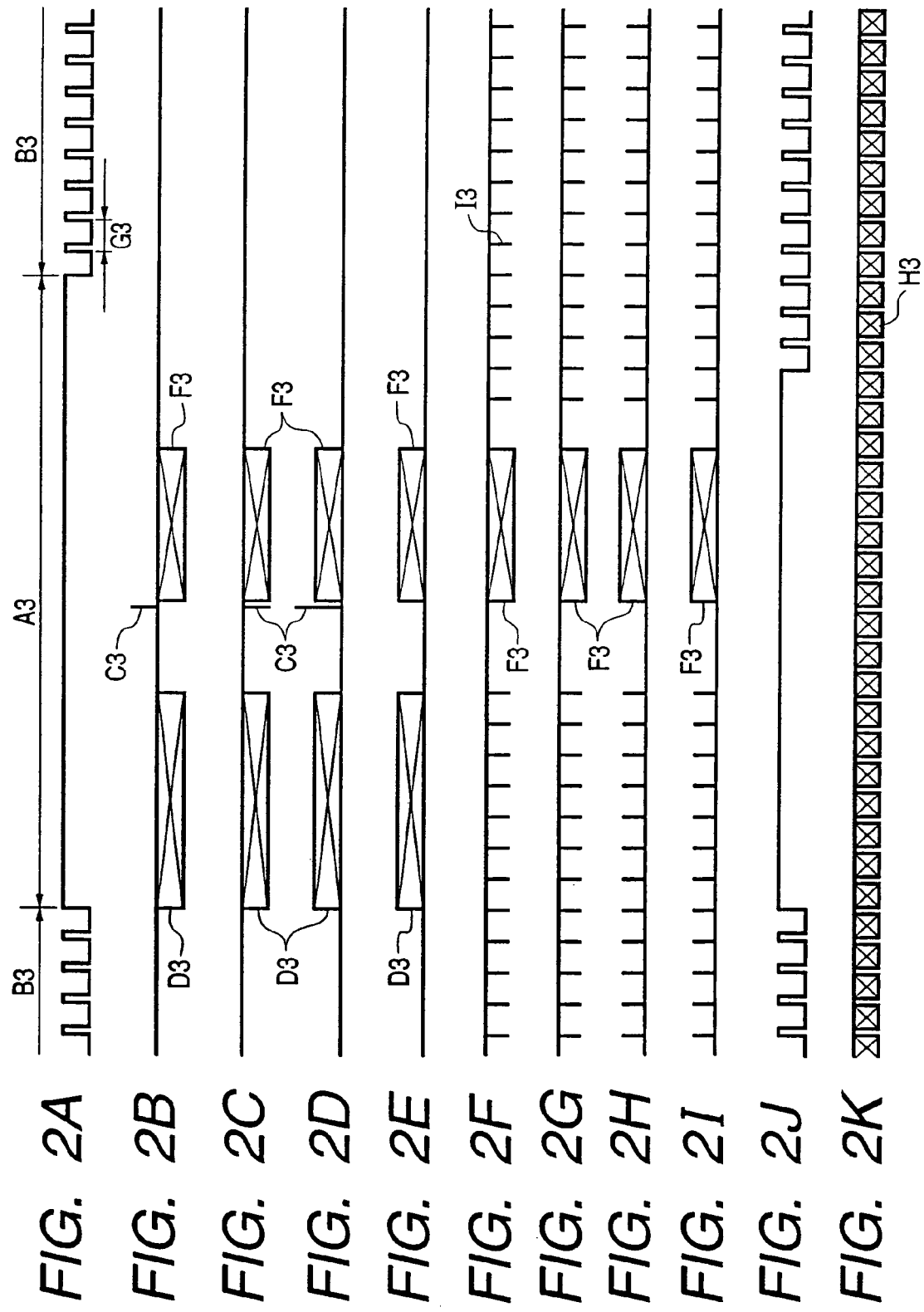
PRIOR ART

PRIOR ART
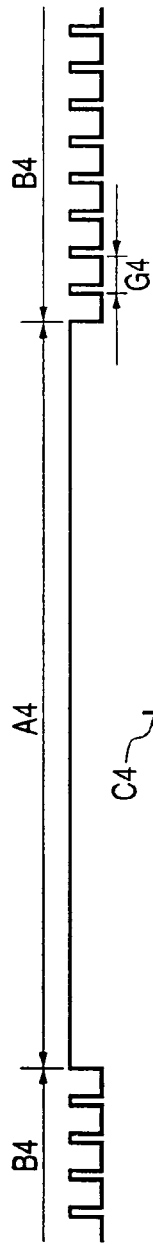
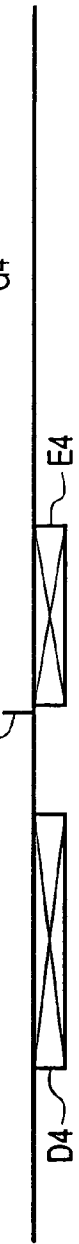
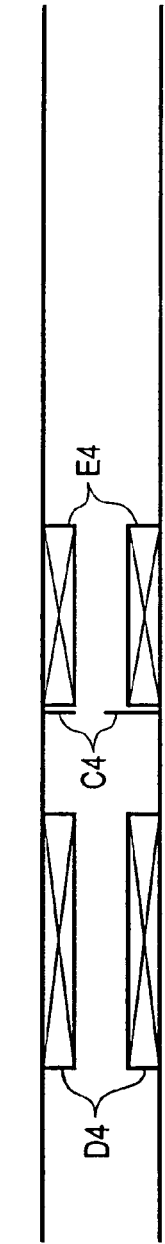
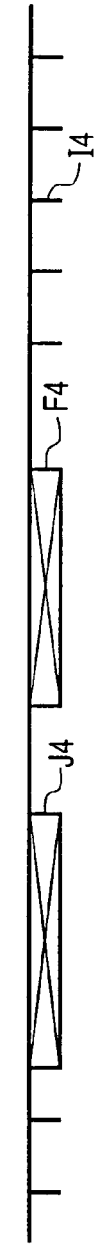
FIG. 3A
FIG. 3B
FIG. 3C
FIG. 3D
FIG. 3E
FIG. 3F
FIG. 3G
FIG. 3H
FIG. 3I
FIG. 3J
FIG. 3K

FIG. 17

| $G_{11}+G_{13}+G_{15}+G_{17}$<br>$+G_{22}+G_{24}+G_{26}+G_{28}$<br>$+G_{31}+G_{33}+G_{35}+G_{37}$<br>$+G_{42}+G_{44}+G_{46}+G_{48}$ | $R_{12}+R_{14}+R_{16}+R_{18}$<br>$+R_{32}+R_{34}+R_{36}+R_{38}$<br>$+R_{52}+R_{54}+R_{56}+R_{58}$<br>$+R_{72}+R_{74}+R_{76}+R_{78}$ | $G_{19}+G_{111}+G_{113}+G_{115}$<br>$+G_{210}+G_{212}+G_{214}+G_{216}$<br>$+G_{309}+G_{311}+G_{313}+G_{315}$<br>$+G_{410}+G_{412}+G_{414}+G_{416}$ |
| --- | --- | --- |
| $B_{21}+B_{23}+B_{25}+B_{27}$<br>$+B_{41}+B_{43}+B_{45}+B_{47}$<br>$+B_{61}+B_{63}+B_{65}+B_{67}$<br>$+B_{81}+B_{83}+B_{85}+B_{87}$ | $G_{55}+G_{57}+G_{59}+G_{511}$<br>$+G_{66}+G_{68}+G_{610}+G_{612}$<br>$+G_{75}+G_{77}+G_{79}+G_{711}$<br>$+G_{86}+G_{88}+G_{810}+G_{812}$ | $B_{29}+B_{31}+B_{33}+B_{35}$<br>$+B_{49}+B_{51}+B_{53}+B_{55}$<br>$+B_{69}+B_{71}+B_{73}+B_{75}$<br>$+B_{89}+B_{811}+B_{813}+B_{815}$ |
| $G_{91}+G_{93}+G_{95}+G_{97}$<br>$+G_{102}+G_{104}+G_{106}+G_{107}$<br>$+G_{111}+G_{113}+G_{115}+G_{117}$<br>$+G_{122}+G_{124}+G_{126}+G_{128}$ | $R_{92}+R_{94}+R_{96}+R_{98}$<br>$+R_{112}+R_{114}+R_{116}+R_{118}$<br>$+R_{132}+R_{134}+R_{136}+R_{138}$<br>$+R_{152}+R_{154}+R_{156}+R_{158}$ | $G_{99}+G_{911}+G_{913}+G_{915}$<br>$+G_{1010}+G_{1012}+G_{1014}+G_{1016}$<br>$+G_{1119}+G_{1111}+G_{1113}+G_{1115}$<br>$+G_{1210}+G_{1212}+G_{1214}+G_{1216}$ |
| $B_{101}+B_{103}+B_{105}+B_{107}$<br>$+B_{121}+B_{123}+B_{125}+B_{127}$<br>$+B_{141}+B_{143}+B_{145}+B_{147}$<br>$+B_{161}+B_{163}+B_{165}+B_{167}$ | $G_{135}+G_{137}+G_{139}+G_{1311}$<br>$+G_{146}+G_{148}+G_{1410}+G_{1412}$<br>$+G_{155}+G_{157}+G_{159}+G_{1511}$<br>$+G_{166}+G_{168}+G_{1610}+G_{1612}$ | $B_{109}+B_{1011}+B_{1013}+B_{1015}$<br>$+B_{129}+B_{1211}+B_{1213}+B_{1215}$<br>$+B_{149}+B_{1411}+B_{1413}+B_{1415}$<br>$+B_{169}+B_{1611}+B_{1613}+B_{1615}$ |

IMAGE PICKUP APPARATUS HAVING AN EXPOSURE CONTROL CIRCUIT

BACKGROUND OF THE INVENTION

1. Field of the Invention

The present invention relates to an image pickup apparatus and method, and more particularly to an image pickup apparatus and method in which signals of pixels in an image pickup area are read out through addition thereof.

2. Related Background Art

A method is known by which a particular image pickup area is displayed with being magnified on a display device by using a smaller number of pixels than the display device. An image pickup apparatus using this method will be described.

FIG. 1 is a schematic diagram showing the structure of an image pickup apparatus. This image pickup apparatus is constituted of photoelectric conversion element 101, vertical transfer paths 102, storage units 103, a horizontal transfer path 104, a signal charge detector 105, and an output unit 106 provided on the opposite side of the horizontal transfer path 104. Arrows indicate a conventional transfer direction of signal charges.

FIGS. 2A to 2K show typical pulse waveforms for driving the image pickup apparatus having the storage units. FIG. 2A shows a composite blanking signal, FIGS. 2B, 2C, 2D and 2E show four-phase clock signals to be applied to the vertical transfer paths 102, having vertical transfer pulse waveforms (hereinafter described as φVA1, φVA2, φVA3, φVA4) to be applied to gates VA1, VA2, VA3 and VA4. FIGS. 2F, 2G, 2H and 2I show four-phase clock signals to be applied to the storage units 103, having vertical transfer pulse waveforms (hereinafter described as φVB1, φVB2, φVB3, φVB4) to be applied to gates VB1, VB2, VB3 and VB4. FIG. 2J shows a discrimination signal (hereinafter described as pre-blanking signal) for discriminating effective CCD output signals. FIG. 2K shows a transfer pulse (hereinafter described as horizontal transfer pulse) to be used for transferring signal charges in the horizontal transfer path 104 to the signal charge detector 105.

Next, a conventional method of driving an image pickup apparatus will be described with reference to FIG. 1 and FIGS. 2A to 2K.

During a vertical blanking period A3, accumulated charges are transferred from the photoelectric conversion element 101 to the vertical transfer paths 102 in response to charge pulses C3 shown in FIGS. 2B to 2E. Next, the charges are transferred from the vertical transfer paths 102 to the storage units 103 by a transfer amount corresponding to the number of stages of each storage unit in response to vertical high speed transfer pulses F3. Next, during an image scanning period B3, the charges are transferred to the horizontal transfer path 104 during each horizontal period G3 by applying vertical transfer pulses I3 to the storage units 103. At the same time, during each horizontal period G3, i.e., at each timing of the vertical transfer pulses I3, signal charges on the horizontal transfer path 104 are output from the signal charge detector 105 by applying horizontal transfer pulses H3 to the horizontal transfer path 104. The horizontal transfer pulses have a frequency capable of transferring the signal charges of one horizontal scan.

From the start of the vertical blanking period A3 until application of the charge pulses C3, vertical high speed transfer pulses D3 are applied to the vertical transfer paths 102 to drain unnecessary charges in the vertical transfer paths 102 from the output unit 106 provided on the opposite side of the horizontal transfer path 104.

With this drive method, the vertical transfer paths 102 and storage units 103 can operate independently and an electronic shutter speed of 1/60 second to 1/1600 second can be attained.

Next, with reference to pulse waveforms shown in FIGS. 3A to 3K, a method will be described by which an image pickup apparatus with storage units is driven to display a partial image area magnified to have twofold vertical and horizontal lengths and a fourfold area ratio. Pulse waveforms shown in FIGS. 3A to 3K are used for magnifying a central area of an image (this magnification operation is described hereinafter as an electronic zoom operation). FIG. 3A shows a composite blanking signal, FIGS. 3B, 3C, 3D and 3E show four-phase clock signals to be applied to the vertical transfer paths 102, respectively represented by φVA1, φVA2, φVA3, φVA4. FIGS. 3F, 3G, 3H and 3I show four-phase clock signals to be applied to the storage units, respectively represented by φVB1, φVB2, φVB3, φVB4. FIG. 3J shows a pe-blanking signal, and FIG. 3K shows horizontal transfer pulse waveforms.

During a vertical blanking period A4, accumulated charges are transferred from the photoelectric conversion element 101 to the vertical transfer paths 102 in response to charge pulses C4. Next, the charges are transferred from the vertical transfer paths 102 to the storage units 103 by a transfer amount corresponding to the number of stages of each storage unit in response to vertical high speed transfer pulses E4. In the storage units 103, the charges are transferred by a transfer amount more than the stages by one fourth the number of stages of each storage unit in response to vertical high speed transfer pulses F4 to drain the charges from the horizontal transfer path 104 and signal charge detector 105. Next, during an image scanning period B4, charges left in the storage units 103 corresponding to three fourths the number of stages are transferred to the horizontal transfer path 104 by applying a vertical transfer pulse 14 to the storage units 103 at timing generally the center of each horizontal scan period and at every second horizontal periods. At the same time, during a period between two vertical transfer pulses, signal charges on the horizontal transfer path 104 are output from the signal charge detector 105 by applying horizontal transfer pulses H4 to the horizontal transfer path 104, the horizontal transfer pulses having a frequency capable of transferring the signal charges of one horizontal scan. With these operations, pixel signals of the photoelectric conversion element 101 in an area from about one fourth to three fourths of the photoelectric conversion element, viewed from the side of the storage units 103, i.e., pixel signals in the central area, are magnified and output during one image scanning period. At the end of the image scanning period B4, signal charges in the photoelectric conversion element in an area of one fourth, located at the opposite side of the storage units 103 are left in a partial area of the storage units 103. These remaining signal charges are transferred to the horizontal transfer path 104 and drained from the signal detector 105 in response to high speed transfer pulses J4 applied at the start period of the next vertical blanking period A4.

Next, the detected signal charges are subjected to a blanking process by a signal processing circuit by using the blanking signal to delay one horizontal scanning period and interpolate the blank area. In this manner, the image magnified two times in horizontal and vertical directions can be displayed in the whole monitor area.

In the above-description, although the central area of an image is magnified, the area to be magnified may be set as desired.

With the above-described process, however, for example, if one fourth the image pickup area is to be displayed in the whole monitor area, the resolution is halved in both vertical and horizontal directions.

SUMMARY OF THE INVENTION

It is an object of the invention to provide an image pickup apparatus capable of displaying an image in any area among a plurality of different divided areas in an image pickup plane with a less or no change in the resolution of the image.

In order to achieve the above object, according to one aspect of the present invention, there is provided an image pickup apparatus comprising: an image pickup area having a plurality of pixels; first read means for reading signals of pixels contained in a first image pickup area in the image pickup area, through addition of n (n is a natural number) pixels; and second read means for reading signals of pixels contained in a second image pickup area smaller than the first image pickup area, through addition of m (m<n, m is a natural number) pixels or without addition.

According to another aspect of the present invention, there is provided a method of controlling an image pickup apparatus, comprising the steps of: reading signals of pixels contained in a first image pickup area in an image pickup area having a plurality of pixels, through addition of n (n is a natural number) pixels; and reading signals of pixels contained in a second image pickup area smaller than the first image pickup area, through addition of m (m<n, m is a natural number) pixels or without addition.

Other objects and features of the invention will become more apparent from the following detailed description of embodiments when read in conjunction with the accompanying drawings.

BRIEF DESCRIPTION OF THE DRAWINGS

FIGS. 2A, 2B, 2C, 2D, 2E, 2F, 2G, 2H, 2I, 2J and 2K are timing charts illustrating a conventional method of driving an image pickup apparatus with CCD image pickup elements.

FIGS. 3A, 3B, 3C, 3D, 3E, 3F, 3G, 3H, 3I, 3J and 3K are timing charts illustrating a conventional method of driving an image pickup apparatus in an electronic zoom operation.

FIG. 17 is a diagram showing image data read in the addition mode.

DETAILED DESCRIPTION OF THE PREFERRED EMBODIMENTS

Figure 1:
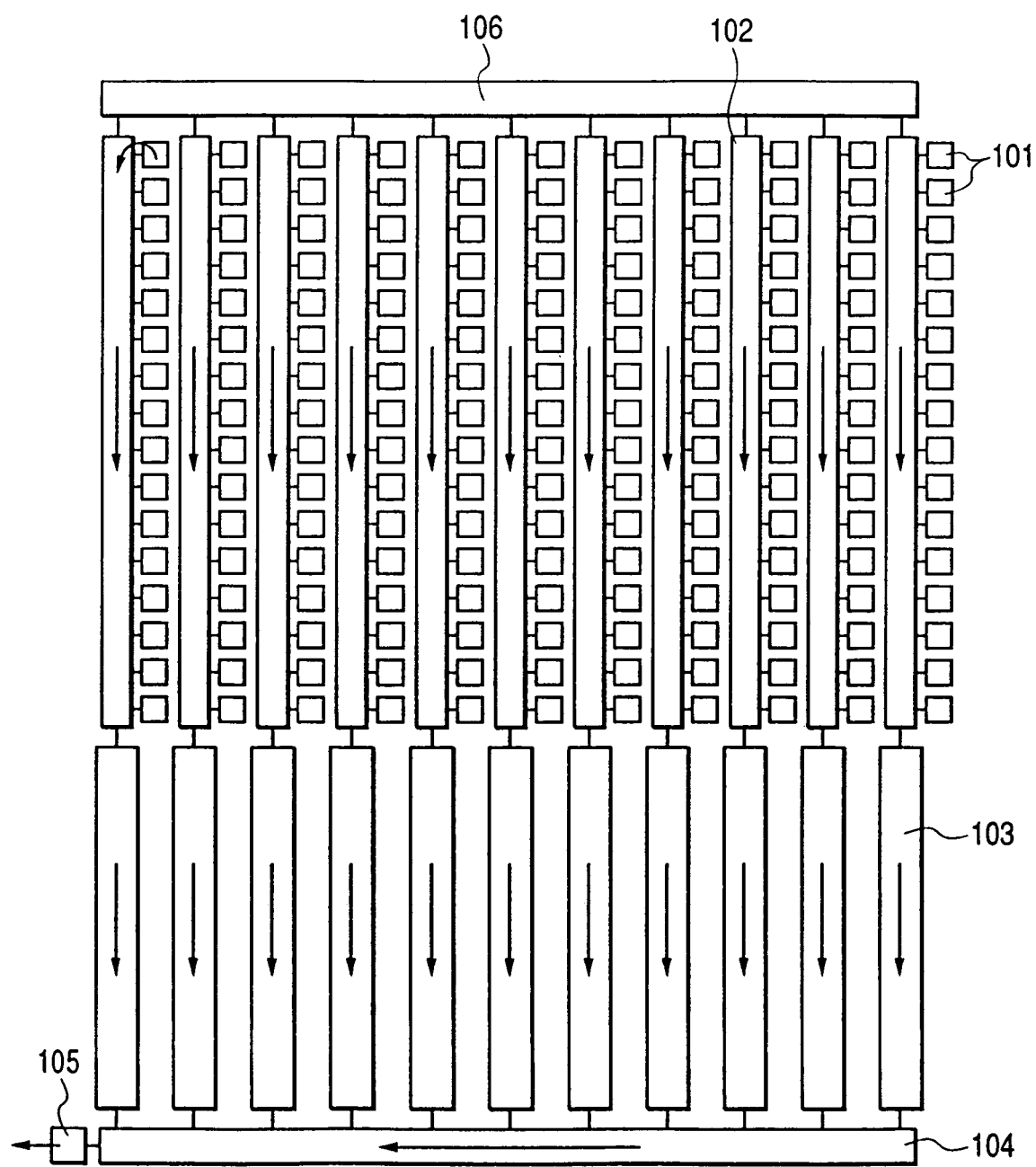
FIG. 1 is a diagram showing the structure of CCD image pickup elements of a conventional image pickup apparatus.
Figure 4A:
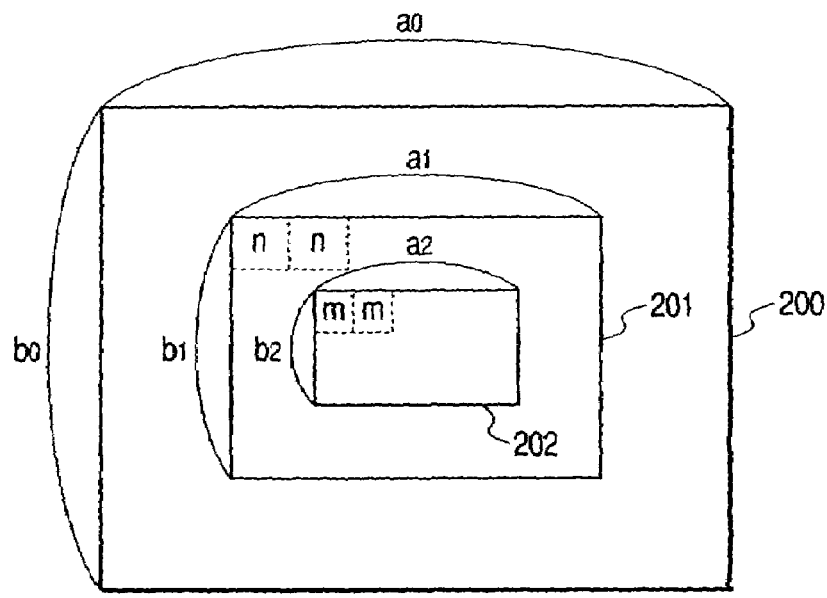
FIGS. 4A, 4B and 4C are schematic diagrams illustrating the outline of the invention.

The outline of the invention will be described with reference to FIGS. 4A to 4C. As shown in FIG. 4A, the number of pixels in an image pickup area 200 of image pickup element is a0×b0, the number of pixels in an image pickup area 201 smaller than the image pickup area 200 is a1×b1, and the number of pixels in an image pickup area 202 smaller than the image pickup area 201 is a2×b2.

According to the invention, pixel data is read in a first mode, through addition of n (n is a natural number) pixels in the image pickup area 201 (first image pickup area), and pixel data is read in a second mode, through addition of m (m<n; m is a natural number) pixels in an image pickup area (second image pickup area) or without addition. Although addition-read is executed in the first mode for the image pickup area 201 in the image pickup area 200, if addition-read is executed in the first mode for the whole image pickup area 200, it can be considered that the image pickup area 201 is replaced by the image pickup area 200 (the first image pickup area of the present invention corresponds to the image pickup area 200).

Figure 4B:
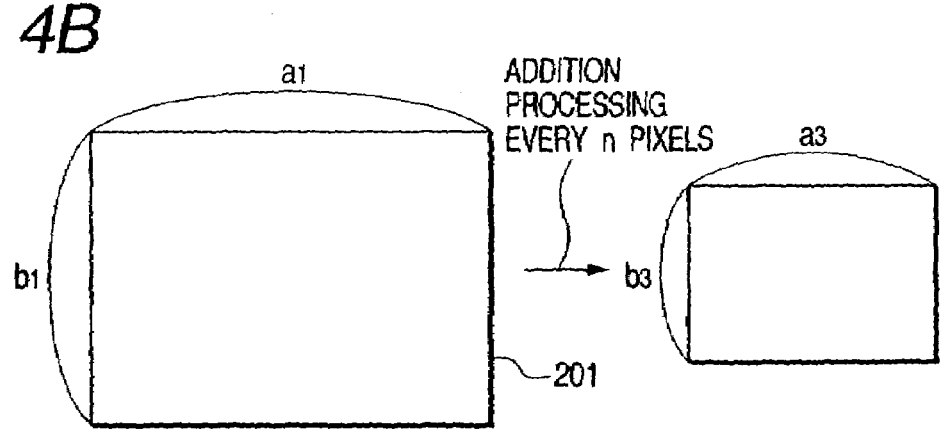
Figure 4C:
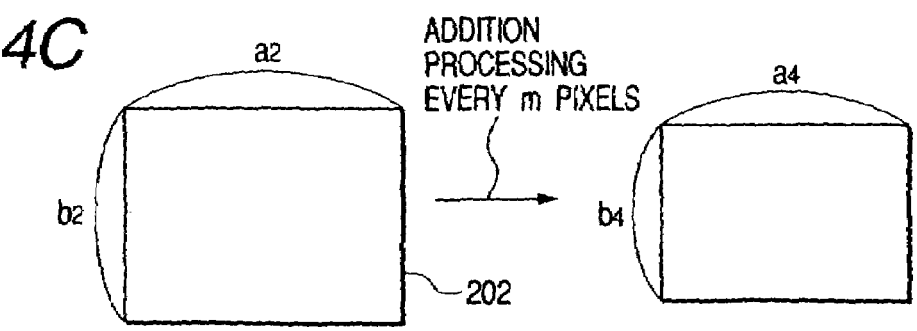

As shown in FIG. 4B, if the number of pixels of a3×b3 (<a1×b1) subjected to the addition-read in the first mode is set equal to the number of pixels of a2×b2 subjected to the non-addition read in the second mode (if a3×b3=a2×b2), the number of pixels of signals read in the first mode becomes equal to the number of pixels read in the second mode. Therefore, it is possible to incorporate the same structures of a storage area and an image processing unit for executing high frequency luminance processing, chrominance processing and the like. If the number of pixels of a3×b3 (<a1×b1) subjected to the addition-read in the first mode shown in FIG. 4B is set equal to the number of pixels of a4×b4 (<a2×b2) subjected to the addition-read in the second mode shown in FIG. 4C (if a3×b3=a4×b4), then it is also possible to incorporate the same structures of the storage area and the image processing unit.

Embodiments of the invention will be described in detail with reference to the accompanying drawings.

Figure 5:
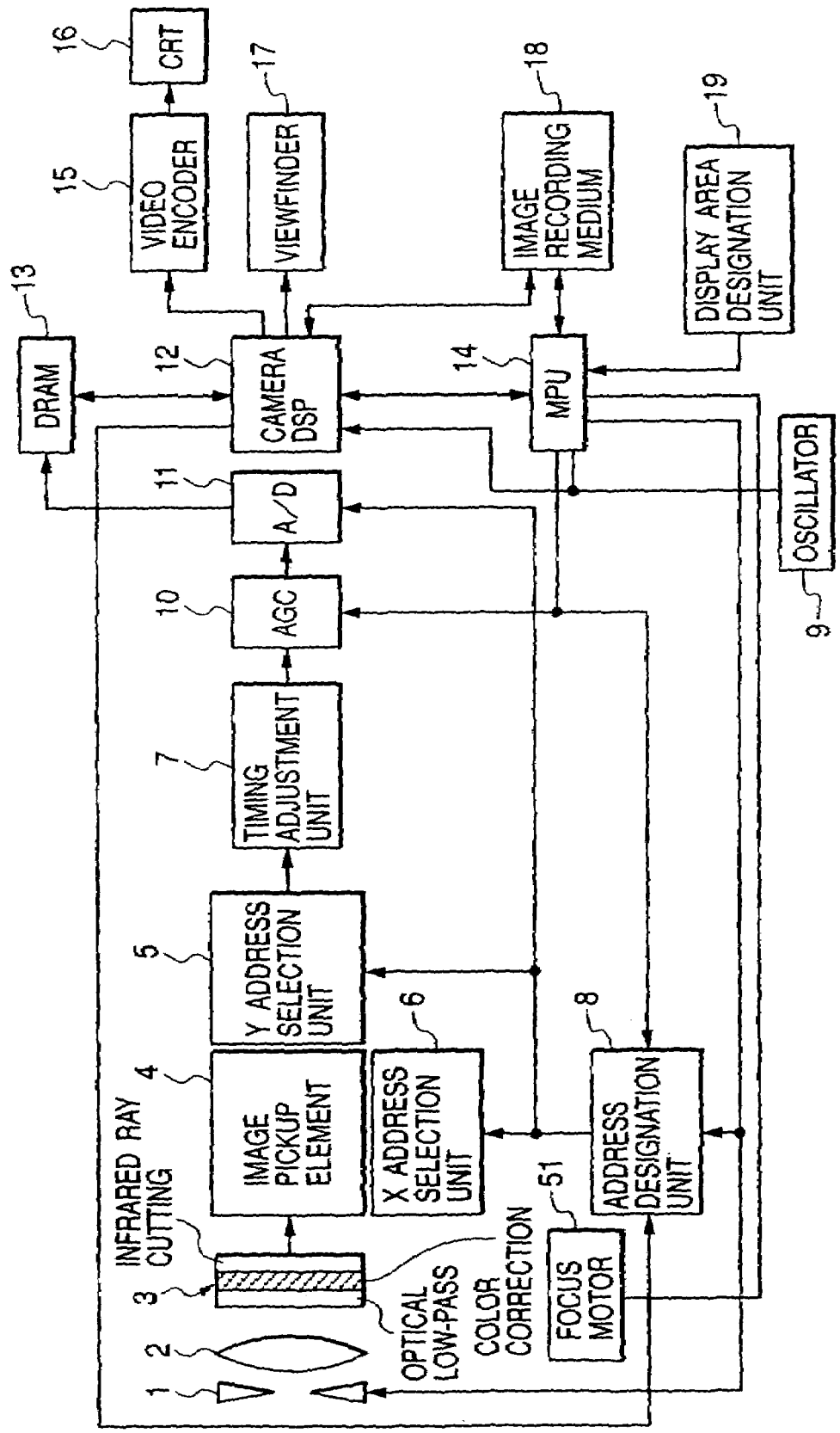
FIG. 5 is a diagram showing the structure of an image pickup apparatus according to an embodiment of the invention.

FIG. 5 is a diagram showing the structure of an image pickup system according to a first embodiment of the invention.

Light from an object passes through an iris 1 and focussed upon an image pickup element (image pickup area) 4 which photoelectrically converts the incidence light into electric signals. Reference numeral 3 represents a filter group constituted of a combination of an optical low-pass filter for cutting high frequency components to eliminate moire or the like, a color compensation filter, an infrared ray cutting filter and the like.

An address designation unit 8 supplies an address signal to an X address selection unit 6 and a Y address selection unit 5 to designate an address in the two-dimensional pixel area and read an image signal photoelectrically converted by the image pickup element 4. The read image signal is supplied to a timing adjustment unit 7 which executes adjustment of a timing of outputs (one to a plurality of outputs) from the image pickup element 4. The voltage of an image signal output from the timing adjustment unit 7 is controlled by an auto gain control (AGC) 10 and then the image signal is converted into a digital signal by an A/D converter 11.

A camera DSP 12 executes image processing on a still image signal or a moving image signal. An MPU 14 sets parameters to be used for this image processing, and executes AE and AF processing. The AF control is performed by moving back and forth a focus lens (not shown) by a focus motor 51.

A DRAM 13 is used as a temporary storage area for the image processing. An image recording medium 18 is used as a non-volatile storage area. The image recording medium 18 may be a Smart medium, a magnetic tape, an optical disk or the like.

A video encoder 15, CRT 16 and the like are provided for displaying processed images. A viewfinder 17 such as an LCD is used for monitoring the object before its image data is stored in the image recording medium 18. As these output devices, not only CRT 16 and viewfinder 17 but also a printer and the like may be used.

Figure 13:
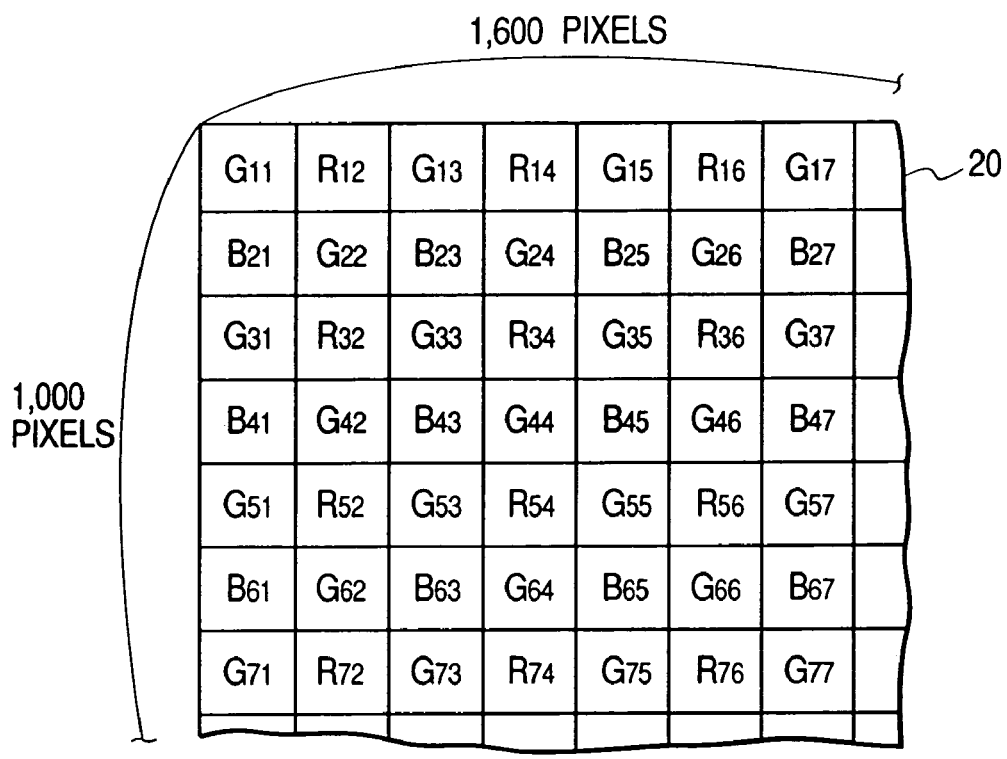
FIG. 13 is a diagram showing the layout of pixels of the image pickup apparatus used by the embodiment.
Figure 16:
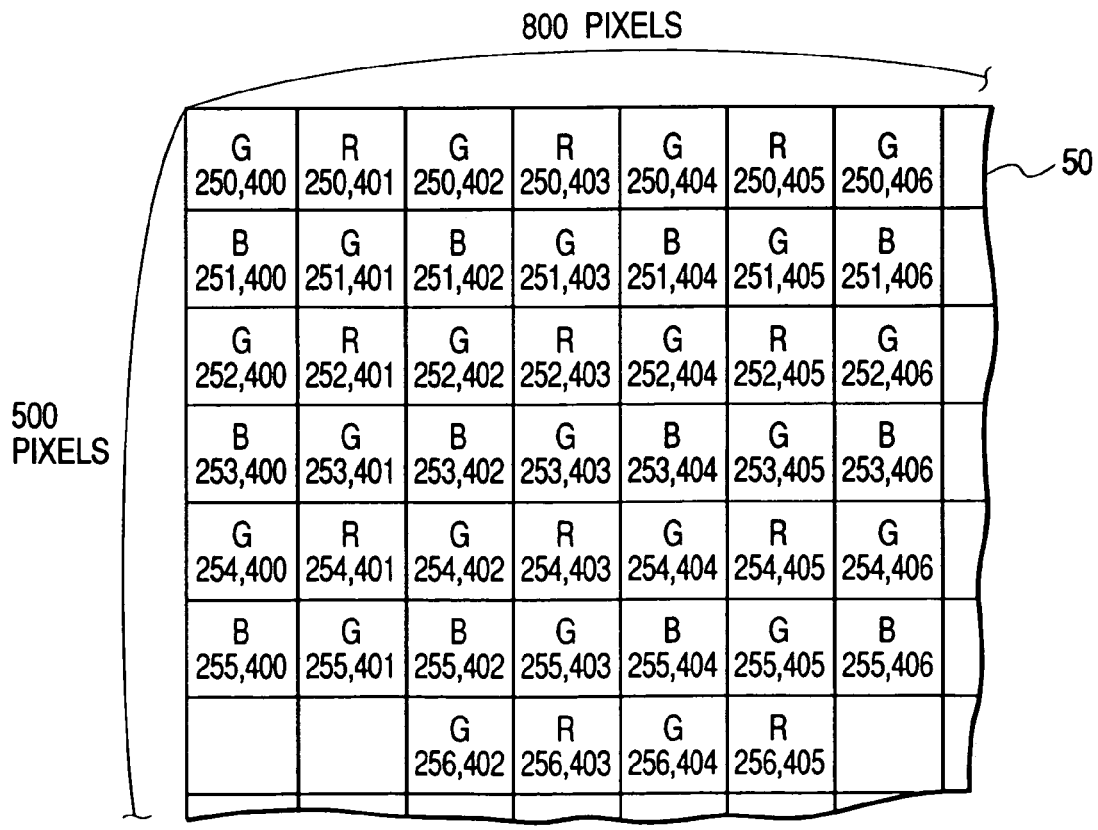
FIG. 16 is a diagram showing image data read in a non-addition mode.

A display area designation unit 19 is a pointer device for designating a read area of, e.g., horizontal 800 pixels× vertical 500 pixels shown in FIG. 16 in the image pickup element having horizontal 1600 pixels×vertical 1000 pixels shown in FIG. 13. In this embodiment, a center point of the read area is designated. Namely, the coordinate value (800, 500) of the center point in the pixel area of horizontal 1600 pixels×vertical 1000 pixels shown in FIG. 13 is designated.

Figure 6:
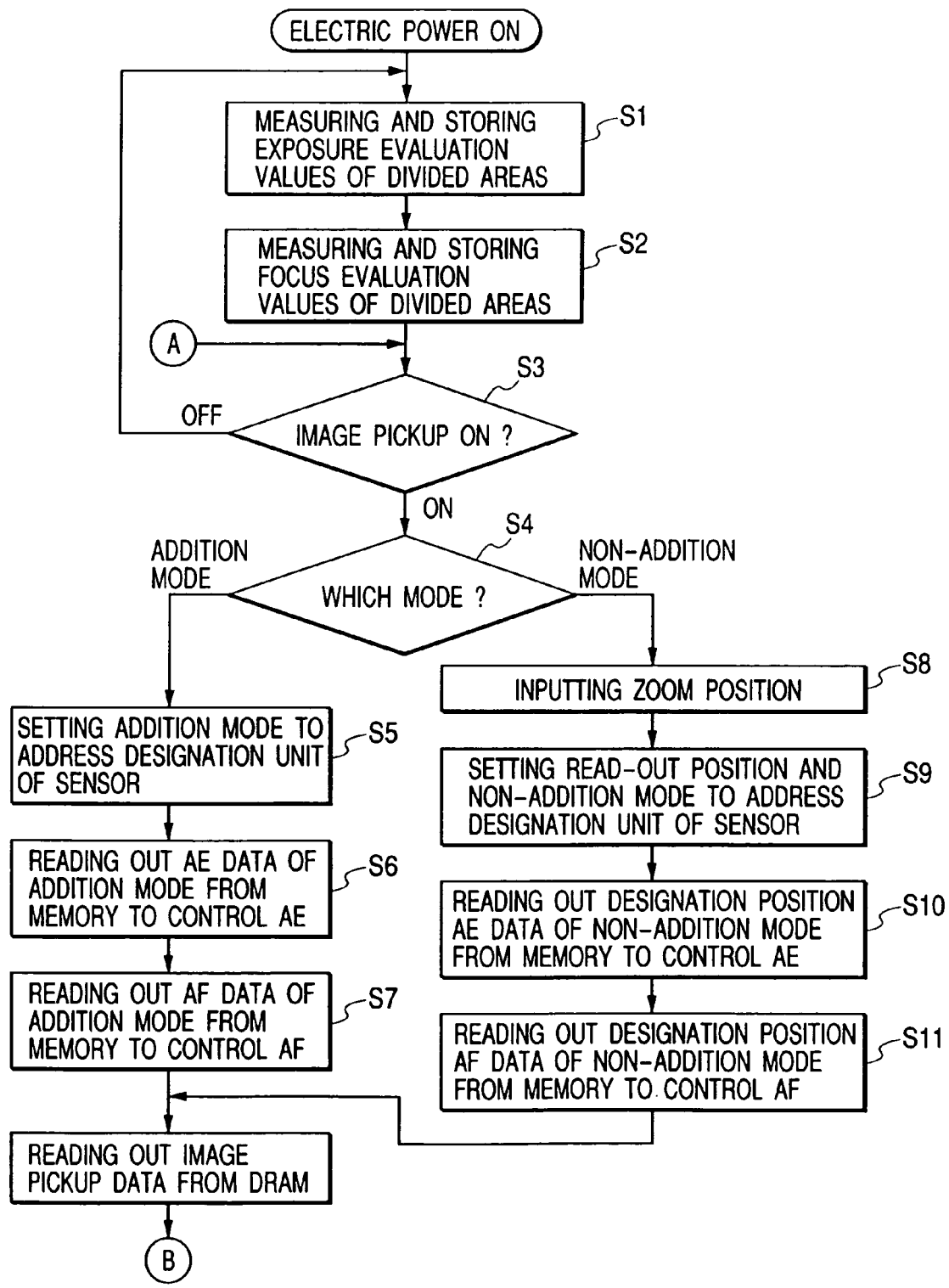
FIG. 6 is a flow chart illustrating the operation of the image pickup apparatus according to the embodiment of the invention.
Figure 7:
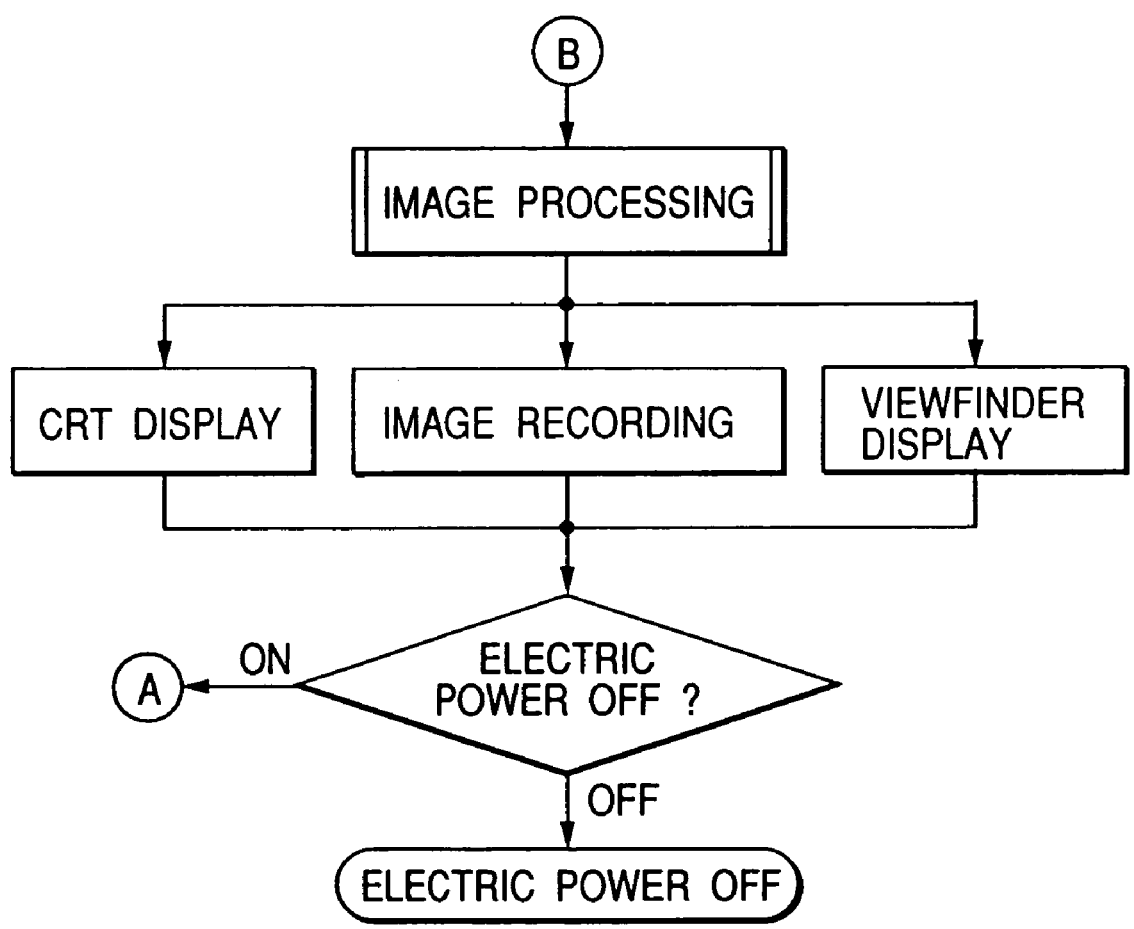
FIG. 7 is a flow chart illustrating the operation of the image pickup apparatus according to the embodiment of the invention.
Figure 10:
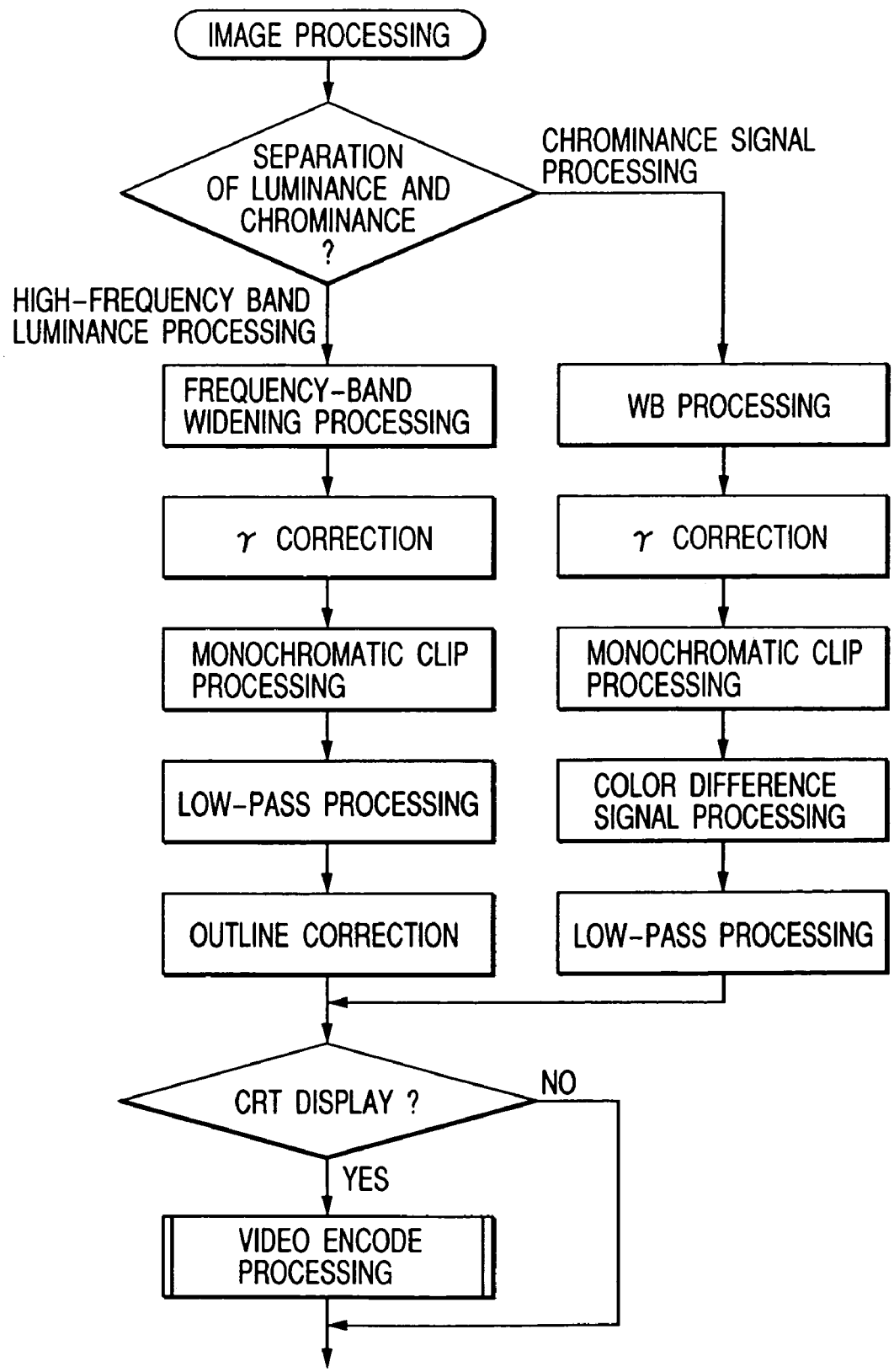
FIG. 10 is a flow chart illustrating an operation of an image processing unit.

FIG. 6 is a flow chart illustrating the overall operation of the image pickup system, FIG. 7 is a flow chart to be followed by the flow chart shown in FIG. 6, and FIG. 10 is a flow chart illustrating the operation of image processing.

Figure 8:
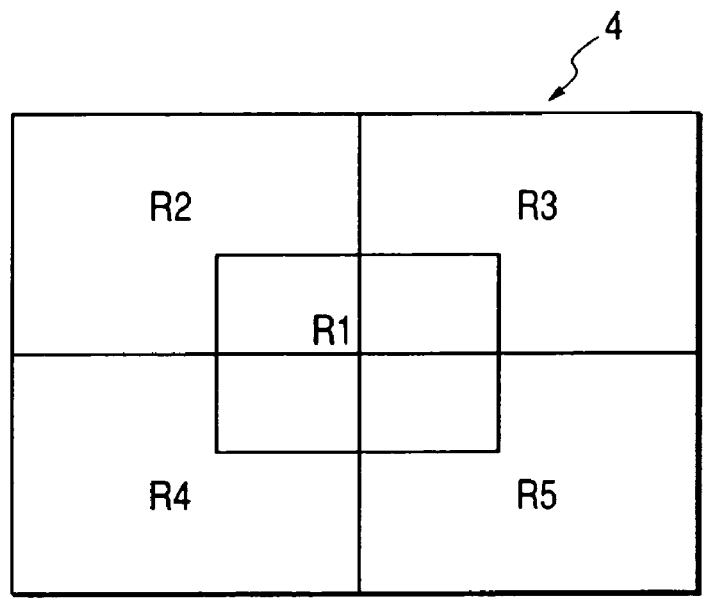
FIG. 8 is a diagram showing an example of divided evaluation areas for AE/AF.

After the power of the image pickup system is turned on, exposure and focus evaluations are executed for divided areas R2 to R5 (including a central area R1) of the image pickup element such as shown in FIG. 8, and evaluation values are stored in the memory (DRAM) 13 (S1 and S2 in FIG. 6). This evaluation is executed periodically.

Figure 15:
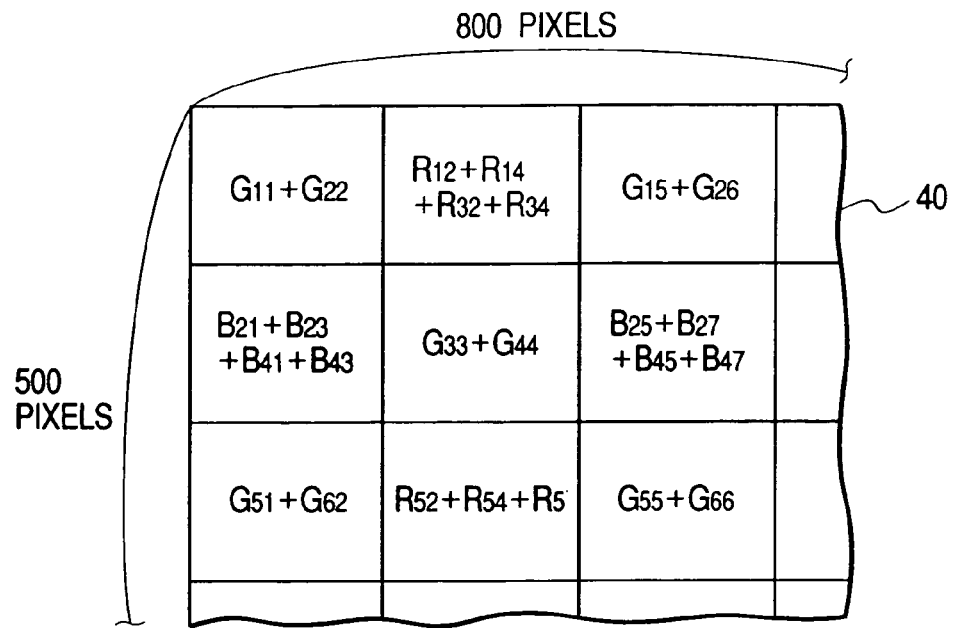
FIG. 15 is a diagram showing image data read in an addition mode.

If image pickup is on, a mode is discriminated (S3 and S4 in FIG. 6). If an addition mode, an addition scan mode for a plurality of pixels of the image pickup element is set to the address designation unit 8 (S5 in FIG. 6). For example, in this mode, addition scan such as shown in FIG. 15 is set.

Next, MPU 14 reads addition mode AE data from the memory, e.g., addition mode AE data for the central area R1 shown in FIG. 8, and sets the iris 1 and an amplification factor of AGC 10 (S6 in FIG. 6). Similarly, addition mode AF data for the central area R1 shown in FIG. 8 is read from the memory to perform an AF control by making the focus motor 51 move the focus lens (not shown) back and forth (S7 in FIG. 6).

If it is judged at S4 that the mode is a non-addition mode, an image pickup area is designated by using the display area designation unit 19 or pointer device (S8 in FIG. 6). In accordance with this zoom position, start addresses are set to the X and Y address selection units 6 and 5. In this case, the address designation unit 8 designates the pixel read address of sequential scanning, which is increased one pixel after another for both X and Y addresses (S9 in FIG. 6).

MPU 14 reads non-addition mode AE data from the memory, e.g., non-addition AE data for the upper left R2 area shown in FIG. 8, and sets the iris 1 and an amplification factor of AGC 10 (S10 in FIG. 6). Similarly, non-addition mode AF data for the upper left area R2 shown in FIG. 8 is read from the memory, and the focus motor 51 drives the focus lens (not shown) back and forth to execute the AF control (S11 in FIG. 6).

Figure 9:
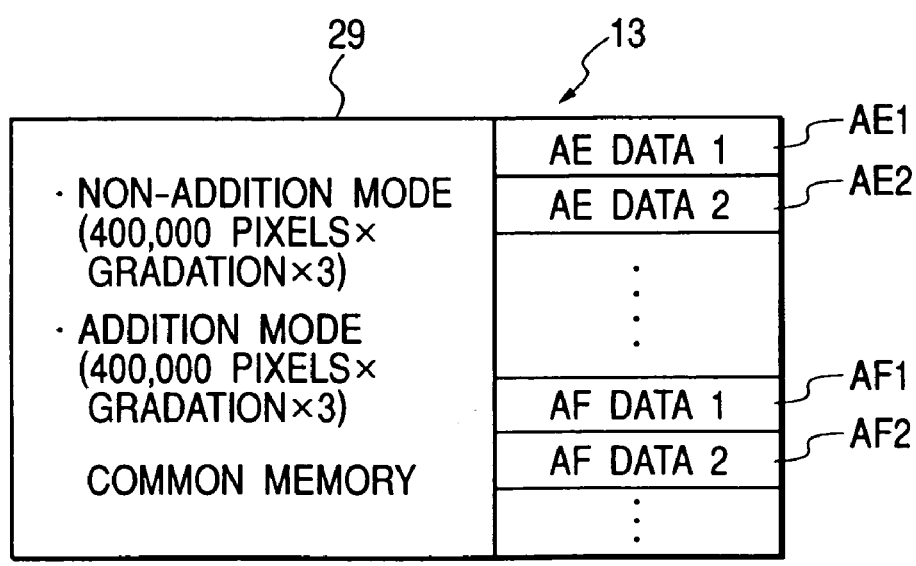
FIG. 9 is a diagram showing a memory map of an image pickup apparatus according to an embodiment of the invention.

The image pickup data of each mode is converted into digital image pickup data by the A/D converter 11 and stored in DRAM 13. In both the addition and non-addition modes, the same memory area 29 (shown in FIG. 9) is used.

The stored image pickup data is processed in the manner as illustrated in the flow chart of FIG. 10. The processed image pickup data is supplied as a luminance signal and color different signals which are subjected to a video-encode process and the like and used for CRT display, image recording, or viewfinder display as illustrated in the flow chart of FIG. 7. A series of above-described operations is repeated starting from the image pickup on/off judgement step.

The addition mode and non-addition mode will be explained in detail.

Figure 11:
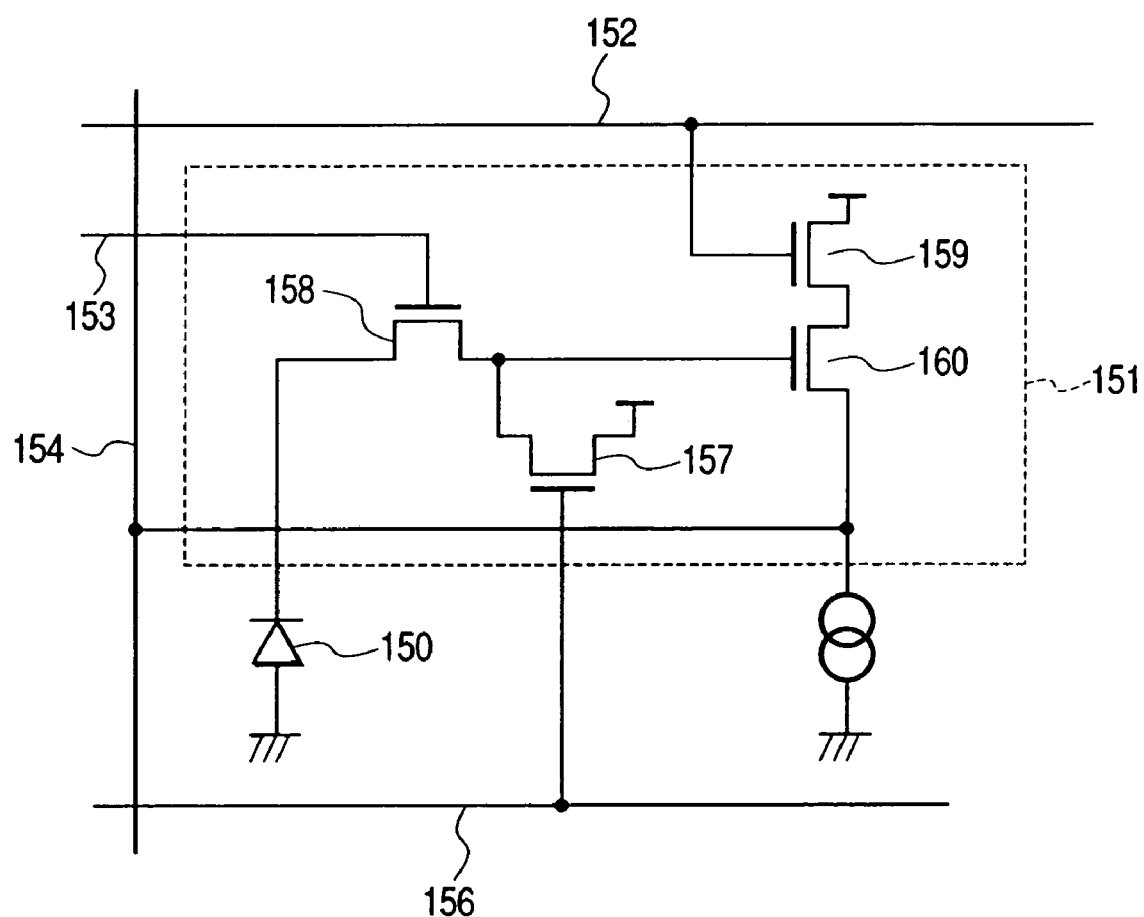
FIG. 11 is a circuit diagram showing the structure of a pixel of the image pickup apparatus.

First, the operation of the image pickup element used by this embodiment will be described. In FIG. 11, reference numeral 158 represents a MOS transistor serving as a potential barrier controlling transfer gate which transfers electric charges accumulated in a photodiode 150 (hereinafter described as PD) to the floating diffusion (hereinafter described as FD) gate of an amplification MOS transistor 160. Reference numeral 157 represents a reset MOS transistor for resetting electric charges in PD 150. Reference numeral 159 represents a line selection MOS transistor. The gates of these MOS transistors 158, 157 and 159 are connected to a transfer signal line 153 for transferring charges in PD 150, a reset signal line 156 for resetting FD 150, and a selection signal line 152, respectively.

Electric charges accumulated in PD 150 are transferred to FD which is reset upon turn-on of the reset transistor 157 by the reset signal line 157, via the MOS transistor 158 selected by the transfer signal line 153, amplified by the source follower MOS transistor 160 with the MOS transistor 159 selected by the selection signal line 152, and then output from a vertical output line 154.

Figure 12:
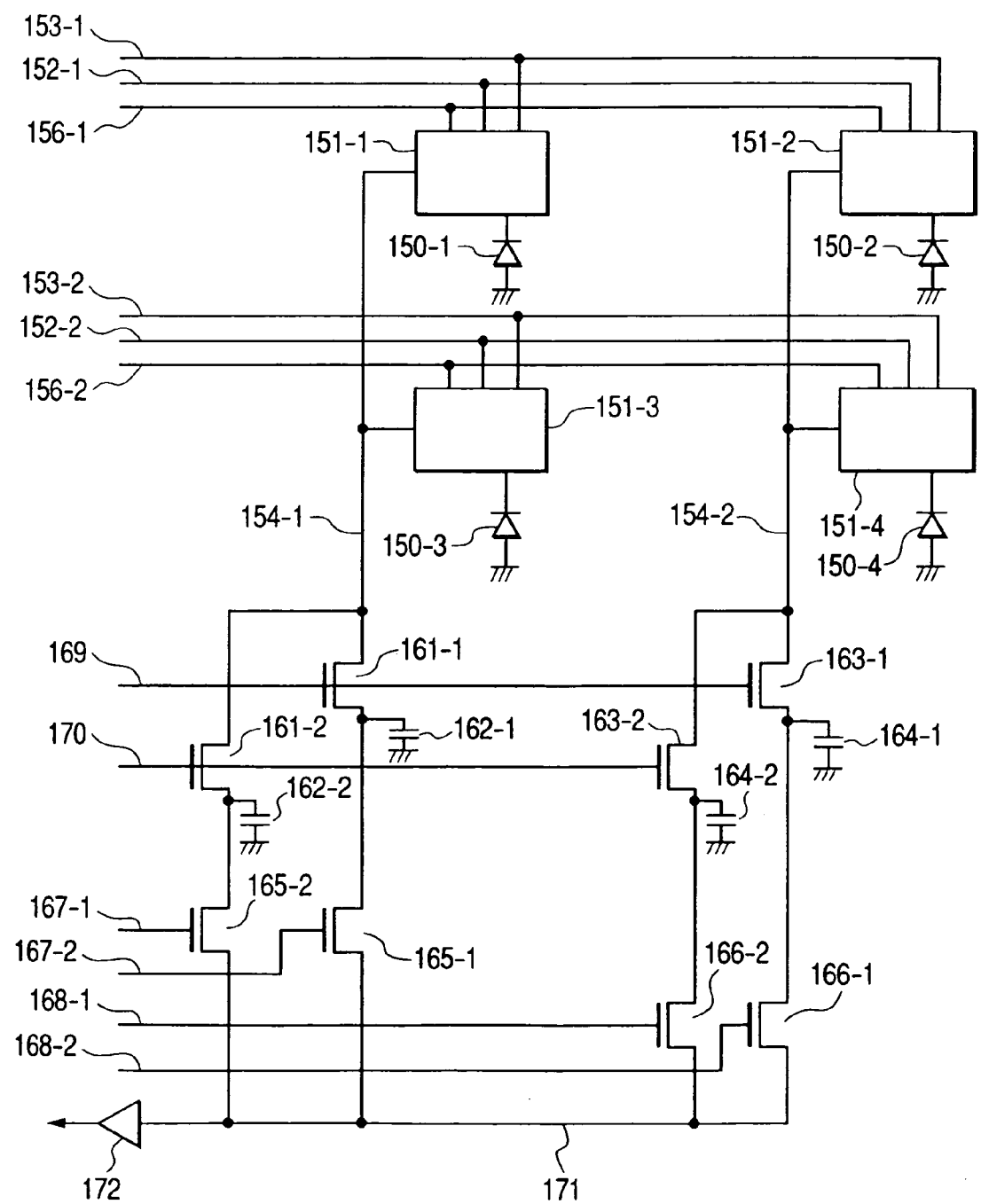
FIG. 12 is a circuit diagram showing the structure of the image pickup apparatus.

FIG. 12 is a diagram showing an image pickup area constituted of a pixel area and a read circuit, the pixel area having a plurality of pixels shown in FIG. 11 disposed along horizontal and vertical directions. In FIG. 12 only 2×2 pixels are shown for simplicity.

For the non-addition control, when a MOS transistor 161-1 shown in FIG. 12 is made conductive by a signal line 169, electric charges in PD 150-1 are stored in a capacitor 162-1. Similarly, electric charges in PD 150-2 are read to a capacitor 164-1 during the read control of PD 150-1 by signal lines 156-1, 153-1, 152-1 and 169. Next, signal lines 167-2 and 168-2 are alternately turned on to read image pickup signals of PD 150-1 and PD 150-2 via an amplifier 172. Electric charges of the next row in the vertical direction can be read by using signal lines 156-2, 153-2 and 152-2 in the manner similar to the above-described operation.

For the addition control, by using signal lines 156-1, 153-1, 152-1 and 169, electric charges in PD 150-1 and PD 150-2 are stored in the capacitors 162-1 and 164-1. Next, by using signal lines 156-2, 153-2, 152-2 and 170, electric charges in PD 150-3 and PD 150-4 are stored in the capacitors 162-2 and 164-2. Thereafter, by turning the signal lines 167-1, 167-2, 168-1 and 168-2 on at the same time, electric charges of PD 150-1, PD 150-2, PD 150-3 and PD 150-4 are added together on a horizontal output line (common output unit) and the added image pickup signal is read out via the amplifier 172. If electric charges of PD 150-1 and PD 150-4 are stored in the capacitors 162-1 and 164-2 and thereafter the signal lines 167-2 and 168-2 are turned on at the same time, an image pickup signal of added electric charges of PD 150-1 and PD 150-4 can be read via the amplifier 172. Electric charges of PD 150-1, PD 150-2, PD 150-3 and PD 150-4 are output from amplifier 172 without addition by sequentially turning the signal lines 167-1, 167-2, 168-1 and 168-2 on.

With the above-described control, the non-addition and addition operations can be executed.

As described above, a desired position in the vertical direction can be selected by a selection control means constituted of the signal lines 156, 153 and 152, and a desired position in the horizontal direction can be selected by a control means constituted of the signal lines 167 and 168.

FIG. 13 shows a pixel unit 20 constituted of horizontal 1600 pixels×vertical 1000 pixels used by the embodiment described earlier.

Figure 14:
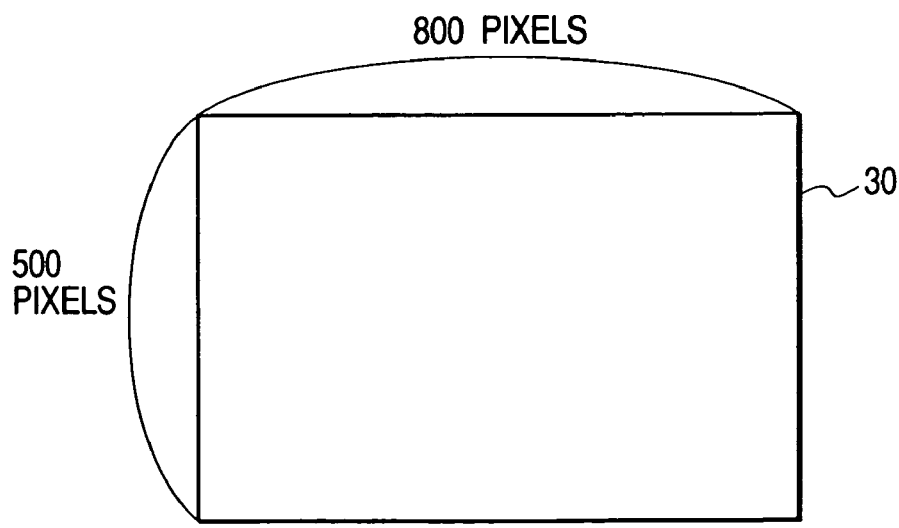
FIG. 14 is a diagram showing the pixel layout of a display device used by the embodiment.

In the addition mode for the pixel unit 20, an image is displayed in the whole area of a display device 30 having horizontal 800 pixels×vertical 500 pixels shown in FIG. 14, by performing pixel addition indicated at 40 in FIG. 15. The optical low-pass filter of the optical filter group 3 shown in FIG. 5 is designed so that aliasing noises are not superposed on the object image in the area of 1600 pixels×1000 pixels. Therefore, if image signals are read by simply picking one pixel from four pixels, moire is formed in the image. In order to avoid this, in this addition mode, as indicated at 40 in FIG. 15, a plurality of pixels are added in vertical and horizontal directions for R and B, and a plurality of pixels are added in diagonal direction for G. Therefore, the spatial frequency of an object image in the addition direction can be lowered and false color to be caused by aliasing noises can be mitigated.

In the non-addition mode, as indicated at 50 in FIG. 16, an image in a quarter area of the pixel unit 20 is displayed and this mode corresponds to a partial zoom. The zooming position is designated by the display area designation unit 19. In this example, the central area (a pixel area from 250-th row to 750-th row and from 400-th column to 1200-th column of the pixel unit shown in FIG. 13) is zoomed. In this case, as indicated at 50 in FIG. 16, non-addition image pickup signals of horizontal 800 pixels×vertical 500 pixels are read. Therefore, one pixel of an image pickup signal corresponds to one pixel of the display device shown in FIG. 14. As compared to a conventional method by which only some pixels are used in a zoom display of one pixel of the image pickup signal, the resolution becomes sufficient.

The number of pixels to be read from the pixel unit is determined both in the addition mode and non-addition mode so as to match the display device 30 having horizontal 800 pixels and vertical 500 pixels. Therefore, the non-addition mode display magnifying a partial area of the addition mode display can be performed without degrading the resolution.

In the embodiment described above, the addition mode illustrated in FIG. 15 is performed for horizontal 800 pixels and vertical 500 pixels starting from the pixel $G_{11}$, relative to all the pixels shown in FIG. 14. An addition mode illustrated in FIG. 17 may be performed for horizontal 1600 pixels and vertical 1000 pixels starting from the pixel $G_{11}$. The area from $G_{11}$ to (800, 500) and the area from $G_{11}$ to (1600, 1000) can be displayed at the same display resolution and with different angles of view.

Figure 18:
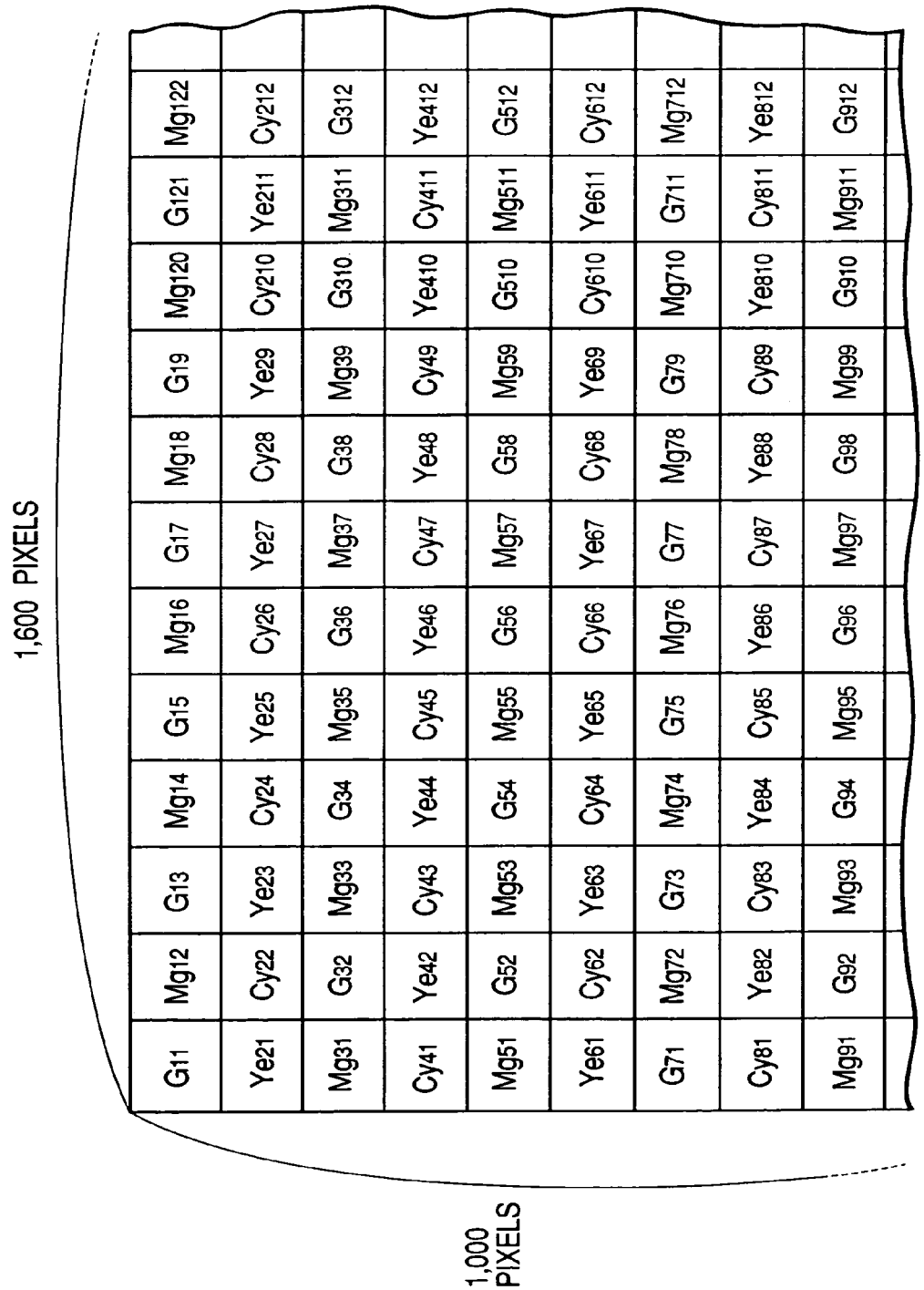
FIG. 18 is a diagram showing the pixel layout used by the embodiment.

If a complementary color filter is used with the pixel unit 20, pixels from $G_{11}$ to (800, 500) are read in the non-addition mode as illustrated in FIG. 18, and after the color separation and image processing, the image pickup signal is displayed on the display unit 30 having horizontal 800 pixels×vertical 1000 pixels.

Figure 19:
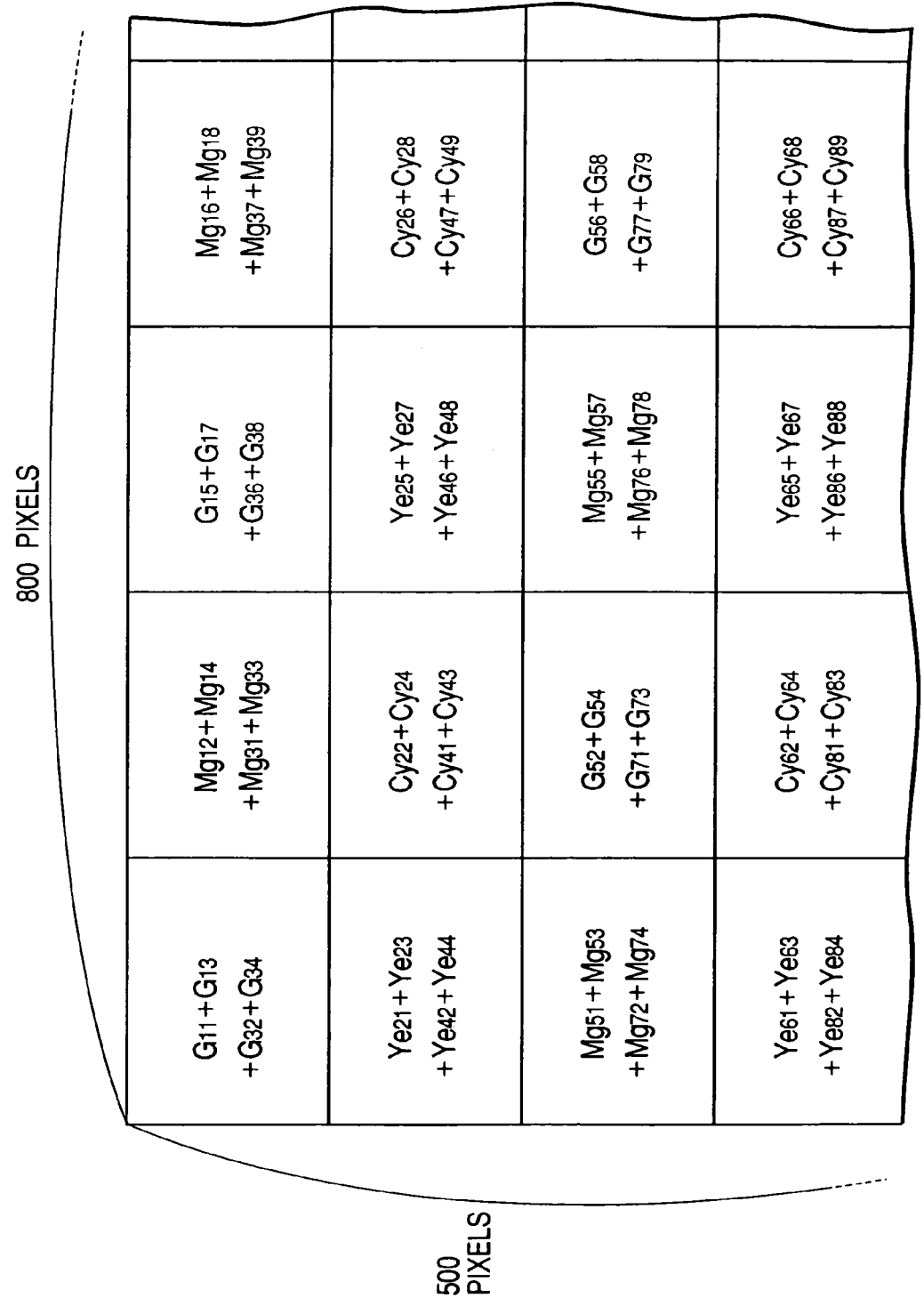
FIG. 19 is a diagram showing image data read in the addition mode.

In the addition mode, the addition illustrated in FIG. 19 may be performed to display an image having the maximum angle of view on the display device 30. In this case, color separation and image processing are similar to the non-addition mode described above.

Figure 20:
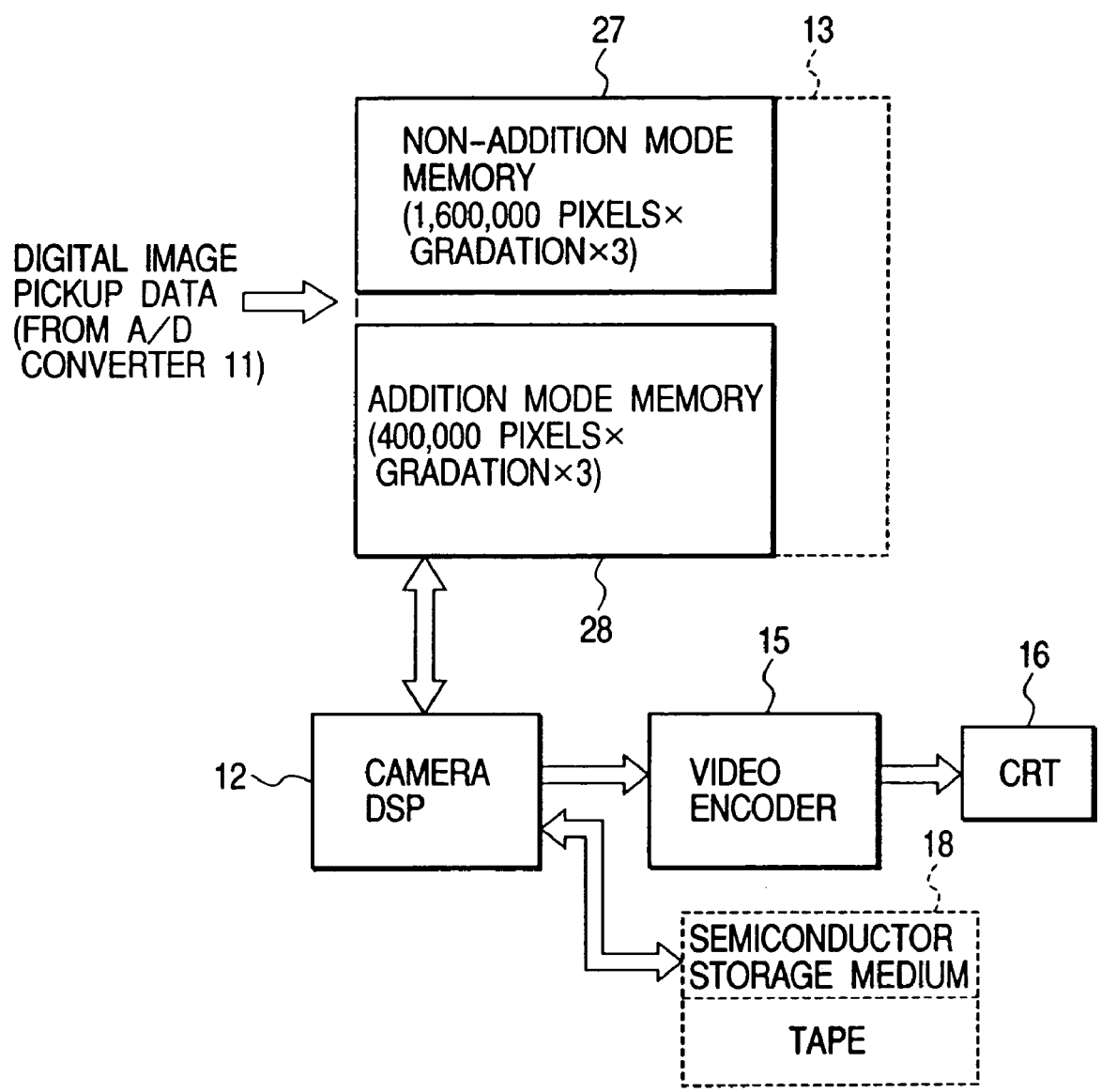
FIG. 20 is a diagram showing the memory structure of a conventional image pickup apparatus.
Figure 21:
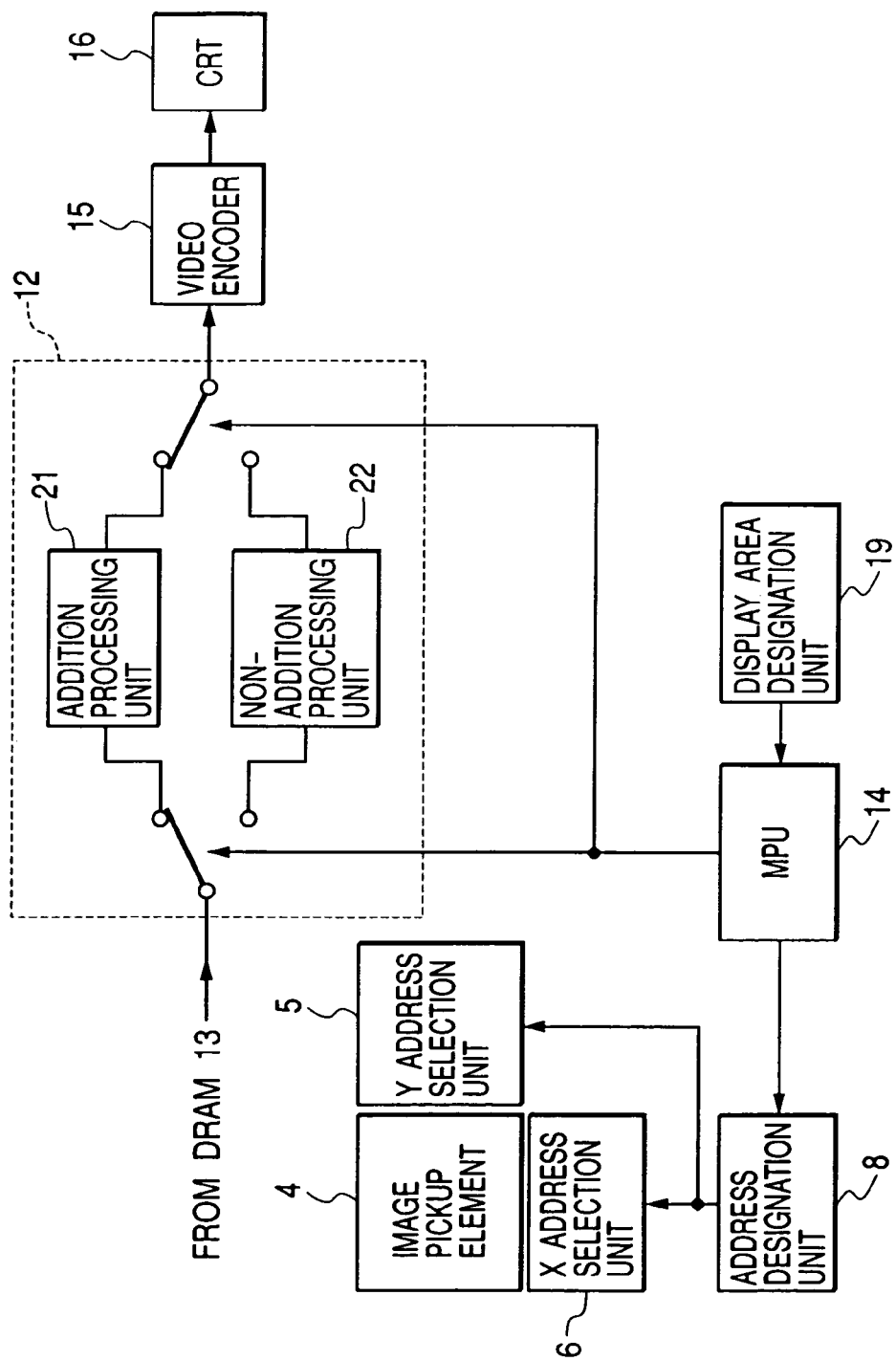
FIG. 21 is a block diagram showing the structure of the image processing unit of a conventional image pickup apparatus.

In an image pickup apparatus having a plurality of image pickup modes, for example, as shown in FIG. 20, it is conceivable that two series of an addition mode memory 28 and a non-addition mode memory 27 are used. Stored image data is independently processed by an addition processing unit 21 and a non-addition processing unit 22 shown in FIG. 21. With this processing scheme, however, the capacity of the memories is a total sum of the capacities of the addition mode memory and non-addition mode memory so that a large capacity becomes necessary. Two series of processing unit are required and a large scale and high speed processing unit becomes necessary.

Figure 22:
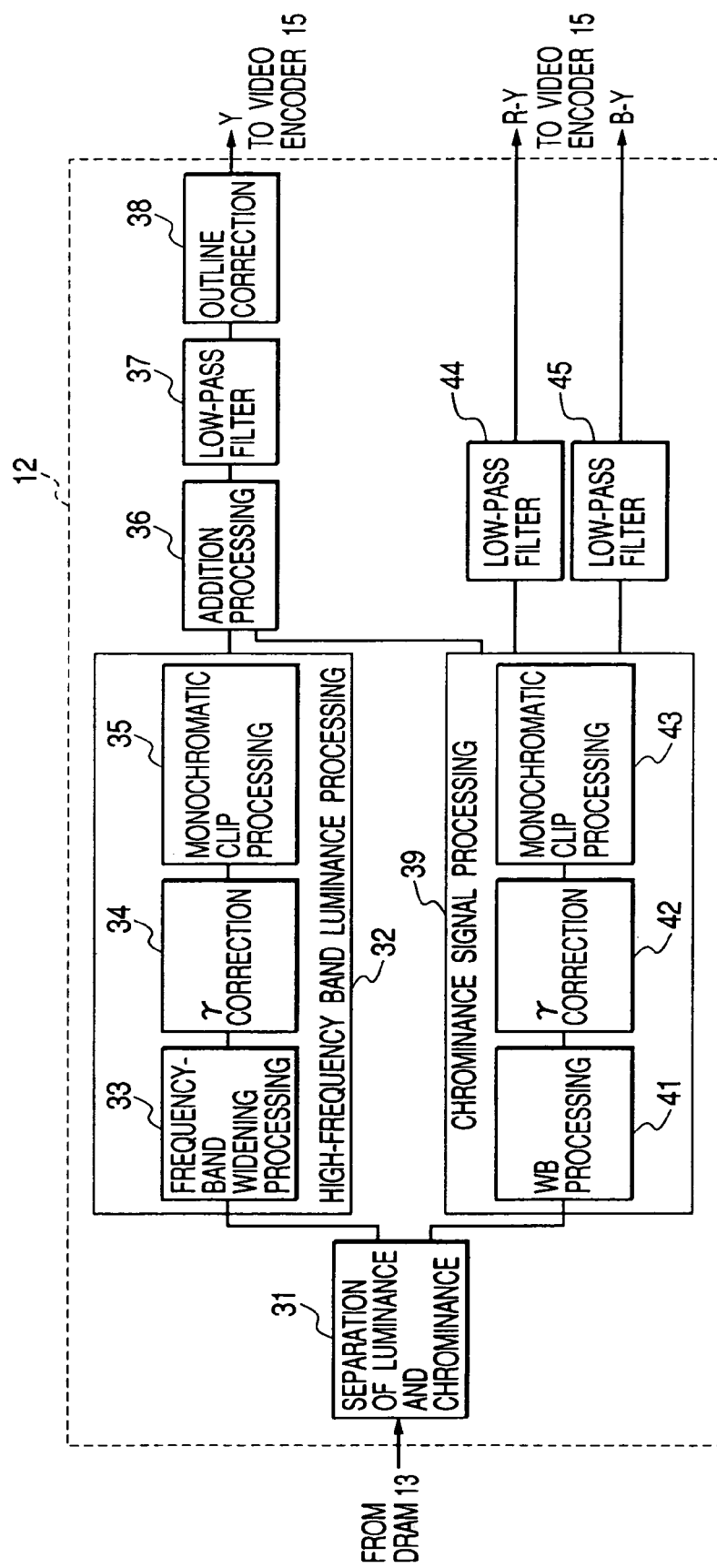
FIG. 22 is a diagram showing the structure of an image processing unit of an image pickup apparatus according to an embodiment of the invention.

In contrast, in the second embodiment, in the addition mode, addition of pixel signals is executed in the image pickup element (image pickup area) 4, and in the non-addition mode, the X and Y address selection units 6 and 5 designate a read position, and a zoom operation is performed by using the same number of pixels as the addition mode. In this manner, the common memory 13 shown in FIG. 9 can be used for both the addition mode and non-addition mode. The series of processing by the camera DSP 12, such as a separation processing 31 of luminance and chrominance, white balance (hereinafter abbreviated as WB) processing 41, gamma (hereinafter abbreviated as γ) corrections 34 and 42, monochromatic clip processing 35 and 43, low-pas filter processing 37, 44 and 45 shown in FIG. 22, can be attained with a common processing unit for the both modes.

Figure 23:
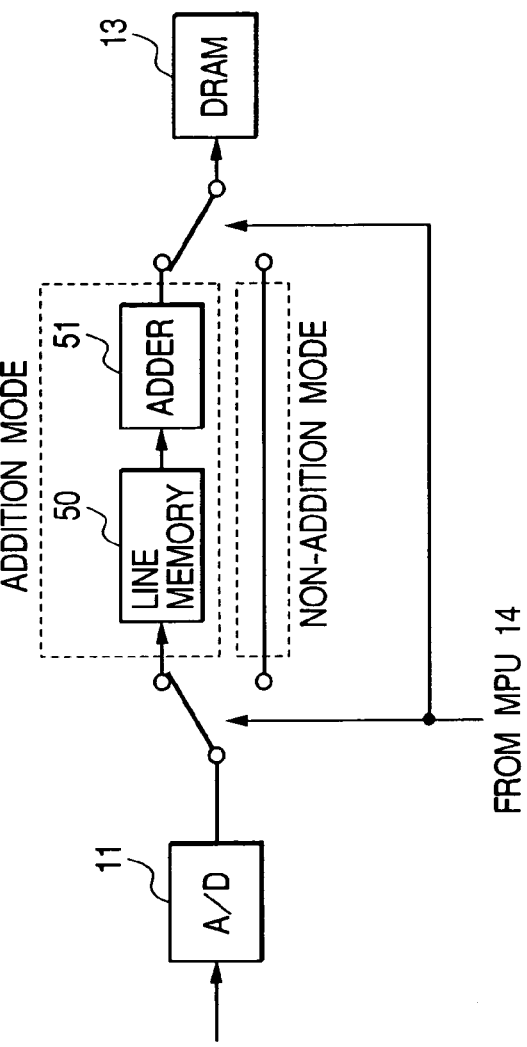
FIG. 23 is a block diagram showing an example of the circuit structure in the addition and non-addition modes.

Addition processing in the addition mode may be realized by providing a line memory 50 and an adder 51 between the A/D converter 11 and DRAM 13, as shown in FIG. 23. In this manner, the pixel addition can be performed similar to pixel addition in the pixel unit.

Figure 24:
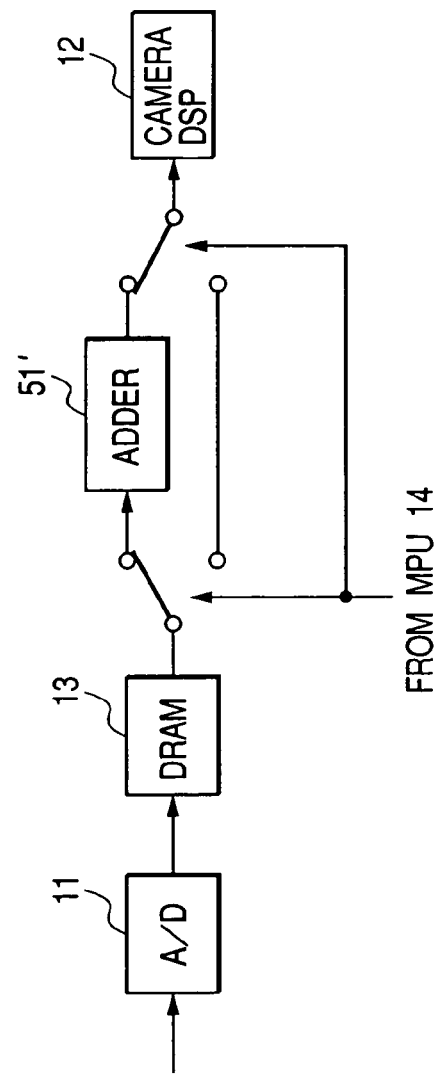
FIG. 24 is a block diagram showing another example of the circuit structure in the addition and non-addition modes.

In the first and second embodiments, if all pixel signals are not required to be read from the pixel unit, only necessary pixel signals are read and output from the pixel unit. All pixel signals in the whole pixel area may be read from the pixel unit and stored once in DRAM 13. Thereafter, as shown in FIG. 24 pixel signals in the whole pixel area may be read from DRAM 13 and added by an adder 51' to thereafter input to the camera DSP 12, or only necessary pixel signals may be read from DRAM 13 and input to DSP 12 without addition or after addition input to DSP 12.

Next, the third embodiment of the invention will be described.

In a general exposure control mechanism, the optical iris 1 and a magnification factor of AGC 10 are controlled. With this control method, as disclosed in JP-A-62-110369, an image frame is divided into a central area and peripheral areas, and an image signal level in each area is detected as an evaluation value which is weighted to control the optical iris and the magnification factor for an image signal.

However, if the image apparatus has a plurality of modes like the embodiment apparatus, only one kind of exposure amount detection is not sufficient for automatic exposure (AE) control.

Figure 25:
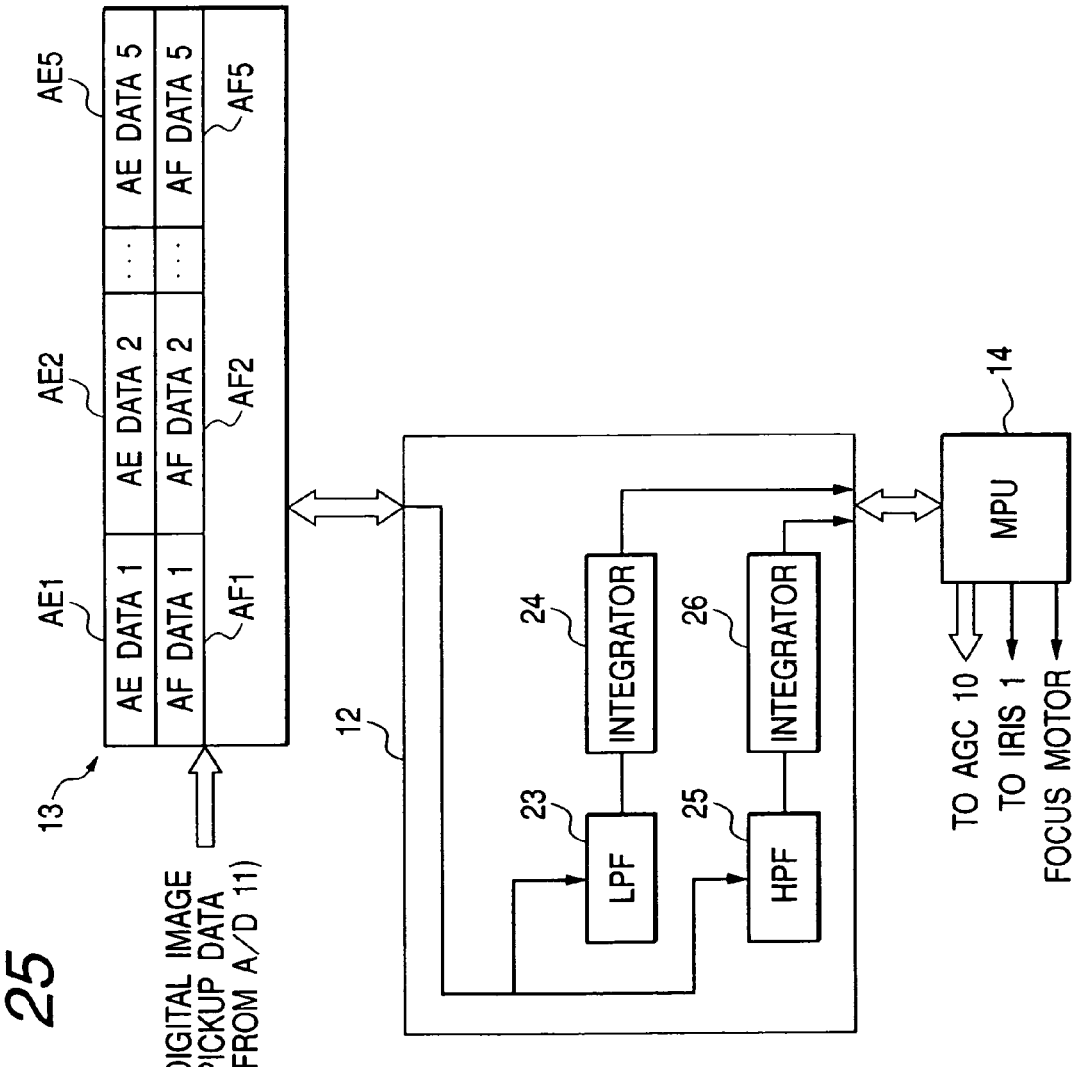
FIG. 25 is a diagram showing a storage state of AE/AF data.

Image signals of areas R1 to R5 shown in FIG. 8 pass through a low-pass filter (LPF) 23 shown in FIG. 25, integrated by an integrator 24, and stored in AE data storage areas AE1 to AE5 in DRAM 13. For example, for 400 thousand-pixel zooming in the non-addition mode, an integrated output of the area R2 shown in FIG. 8 of the sensor or image pickup element 4 is stored as AE data 1. In the addition mode, since image signals in the whole area of the sensor 4 are used, an integrated output of the area R1 or central area shown in FIG. 8 is stored as AE data 2.

In this manner, an exposure evaluation value for each mode is stored in the memory. When the mode is switched, the AE control is performed in accordance with the stored photometry evaluation value. In this manner, exposure suitable for a light amount in a desired zooming area can be set quickly.

Photometry evaluation values of the areas R1 to R5 may be stored in advance in DRAM 13. In this case, in accordance with the selected mode and zooming area, the AE control is performed, and then a desired area in the image pickup element 4 can be zoomed quickly.

In a general focus control mechanism, the focus motor is driven to obtain an in-focus state, in accordance with a comparison of the focus evaluation values between the current field and previous field.

Similar to the AE control, if the image apparatus has a plurality of modes like the embodiment apparatus, only one kind of focus evaluation value is not sufficient for quick automatic focus (AF) control.

Image signals of areas R1 to R5 shown in FIG. 8 pass through a high-pass filter (HPF) 25 shown in FIG. 25, are integrated by an integrator 26, and are stored in AF data storage areas AF1 to AF5 in DRAM 13. For example, for 400 thousand-pixel zooming in the non-addition mode, an integrated output of the area R2 shown in FIG. 8 of the image pickup element 4 is stored as AF data 2. In the addition mode, since image signals in the whole area of the sensor 4 are used, an integrated output of the area R1 or central area shown in FIG. 8 is stored as AF data 1.

In this manner, a focus evaluation value for each mode is stored in the memory. When the mode is switched, the AF control for a desired zooming area can be reliably and quickly performed in accordance with the stored previous field focus evaluation value and current field focus evaluation value.

Focus evaluation values of the areas R1 to R5 may be stored in advance in DRAM 13. In this case, in accordance with the selected mode and zooming area, the AF control is performed, and then the AF control for the desired zooming position in the sensor 4 can be performed quickly.

Next, the fourth embodiment of the invention will be described. In this embodiment, the display area designation unit 19 shown in FIG. 5 is used for designating a center of a block to be read in the non-addition mode. The display area designation unit 19 may be a pointer for designating the start and end points.

Figure 26A:
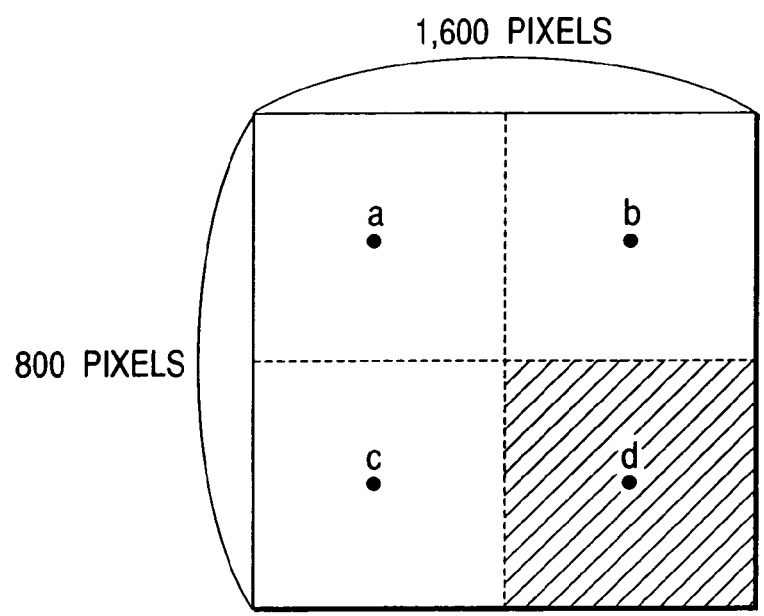
FIGS. 26A and 26B are diagrams illustrating limitation of a read area of an image pickup element.
Figure 26B:
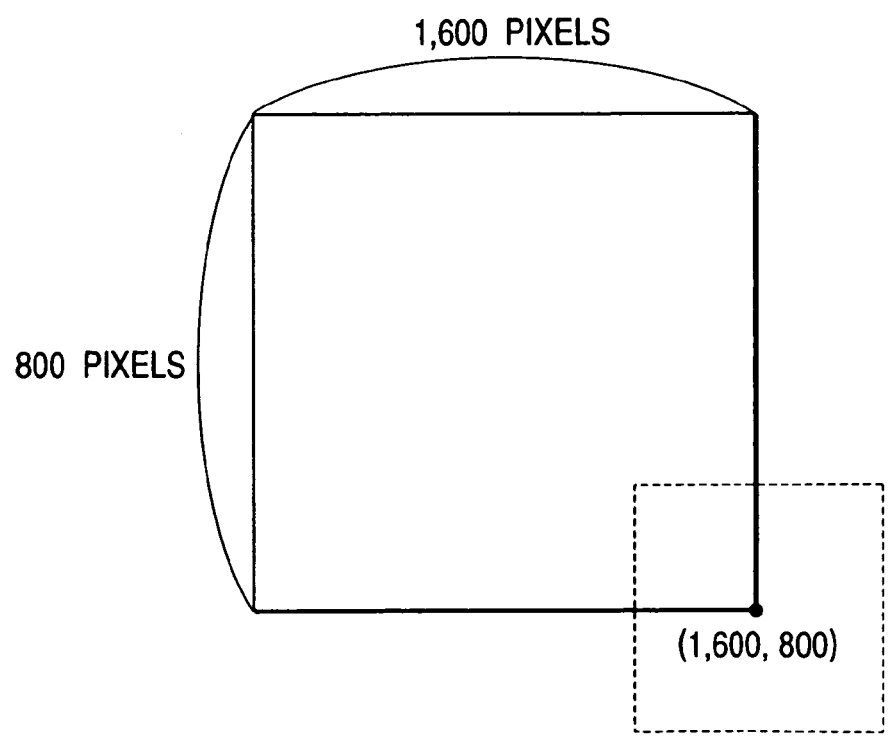

It is assumed herein that horizontal 800 pixels×vertical 500 pixels are fixed as a read area size as shown in FIG. 16. If a coordinate (1600, 800) shown in FIG. 26B is designated, there is an area from which pixel signals cannot be read. In this case, it is assumed that a point d shown in FIG. 26A, i.e., a coordinate (1200, 600), was pointed and pixel signals are read from a hatched area and displayed. Other points a (400, 200), b (1200, 200) and c (400, 600) are also provided in correspondence with the three corners to thereby limit the display area.

If a coordinate is designated which requests the read area other than the read areas corresponding to the points a to d, then it is assumed that one of the points a to d nearest to the designated coordinate was pointed to select the corresponding read area, and thereby limiting the display area.

As described so far, according to the embodiments of the image pickup apparatus, the first addition mode and the non-addition mode (or second addition mode using the number of pixels smaller than the first addition mode) are controlled to perform a zoom display without degradation of the resolution.

The same number of read pixel signals are used for both the first addition mode and the non-addition mode (second addition mode using the number of pixels smaller than the first addition mode). Therefore, the same structure of the processing circuit can be used for both the modes, and a memory and processing circuit of one series can be used.

When the image pickup area or the mode is switched, the AE/AF control can be performed smoothly by using pre-stored values.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   an image pickup area having a plurality of pixels;
   a read circuit having a first read-out mode for reading signals of pixels contained in a first image pickup area in said image pickup area, through addition of n (n is a natural number) pixels, and having a second read-out mode for reading signals of pixels contained in a second image pickup area smaller than the first image pickup area, through addition of m (m<n, m is a natural number) pixels or without addition, wherein plural colors are picked up in each of said first and second pickup areas; and
   an exposure control circuit which comprises an amplifier circuit which is arranged to control an amplification factor of the signals read out from the first and second image pickup areas respectively, in accordance with the first and second read-out modes.

2. An image pickup apparatus according to claim 1, wherein said image pickup area includes a common output unit to which signals of a plurality of pixels are read and output sequentially, and wherein said read circuit reads signals through addition of n pixels to the common output unit in the first read-out mode, and reads signals through addition of m pixels or without addition to the common output unit in the second read-out mode.

3. An image pickup apparatus according to claim 2, wherein said read circuit performs addition of n pixels in the common output unit in the first read-out mode.

4. An image pickup apparatus according to claim 1, further comprising:
an analog/digital conversion circuit which converts a signal read from said image pickup area into a digital signal,
wherein said image pickup area includes a common output unit to which signals of a plurality of pixels are read out sequentially and whose output is supplied sequentially to said analog/digital conversion circuit,
wherein said read circuit reads out digital signals converted by said analog/digital conversion circuit through addition of n pixels in the first read-out mode, and
wherein said read circuit reads out digital signals converted by said analog/digital conversion circuit through addition of m pixels or without addition in the second read-out mode.

5. An image pickup apparatus according to claim 1, further comprising an image data processing circuit which processes signals read by said read circuit in the first read-out mode and signals read by said read circuit in the second read-out mode by using a same processing unit.

6. An image pickup apparatus according to claim 1, wherein the number of signals read by said read circuit in the first read-out mode is approximately equal to the number of signals read by said read circuit in the second read-out mode.

7. An image pickup apparatus according to claim 1, wherein said exposure control circuit stores an exposure evaluation value and a focus evaluation value for said image pickup area and uses the exposure evaluation value and the focus evaluation value for an exposure control and a focus control in accordance with designation of either the first or second read-out modes and/or in accordance with designation of the first and second image pickup areas.

8. An image pickup apparatus according to claim 1, further comprising:
a lens for focusing light upon said image pickup area; and
an image data processing circuit which forms a luminance signal and color signals by processing signals read from said image pickup area.

9. An image pickup apparatus comprising:
an image pickup area including pixels arranged in horizontal and vertical directions, vertical output lines to which signals of pixels are read out and a horizontal output line to which signals from the vertical output lines are read out;
a driver circuit for controlling transistors in said image pickup area to effect a first read-out mode for reading signals of pixels contained in a first image pickup area in said image pickup area through addition of n (n is a natural number) pixels to the horizontal output line and a second read-out mode for reading signals of pixels contained in a second image pickup area smaller than the first image pickup area through addition of m (m<n, m is a natural number) pixels or without addition to the horizontal output line, wherein plural colors are picked up in each of said first and second pickup areas; and
an exposure control circuit which comprises an amplifier circuit which is arranged to control an amplification factor of the signals read out from the first and second image pickup areas respectively, in accordance with the first and second read-out modes.

10. An image pickup apparatus comprising:
an image pickup area including a plurality of pixels;
an analog/digital converter circuit for converting a signal read out from said image pickup area into a digital signal;
a processing circuit for processing digital signals which are output from said analog/digital converter circuit and correspond to signals read out in a first read-out mode for reading out signals of pixels contained in a first image pickup area in said image pickup area, through addition of n (n is a natural number) pixels, and which correspond to signals read out in a second read-out mode for reading out signals of pixels contained in a second image pickup area smaller than the first image pickup area through addition of m (m<n, m is a natural number) pixels or without addition, wherein plural colors are picked up in each of said first and second pickup areas; and
an exposure control circuit which comprises an amplifier circuit which is arranged to control an amplification factor of the signals read out from the first and second image pickup areas respectively, in accordance with the first and second read-out modes.

11. A method of controlling an image pickup apparatus, comprising the steps of:
effecting a first read-out mode for reading signals of pixels contained in a first image pickup area in an image pickup area having a plurality of pixels, through addition of n (n is a natural number) pixels; and
effecting a second read-out mode for reading signals of pixels contained in a second image pickup area smaller than the first image pickup area, through addition of m (m<n, m is a natural number) pixels or without addition, wherein plural colors are picked up in each of said first and second pickup areas; and
effecting exposure control so as to amplify the signals read out from the first and second image pickup areas respectively, by controlling an amplification factor in accordance with the first and second read-out modes.

* * * * *

UNITED STATES PATENT AND TRADEMARK OFFICE
CERTIFICATE OF CORRECTION

PATENT NO. : 7,154,542 B1  
APPLICATION NO. : 09/655862  
DATED : December 26, 2006  
INVENTOR(S) : Osamu Yuki et al.

It is certified that error appears in the above-identified patent and that said Letters Patent is hereby corrected as shown below:

ON COVER PAGE AT (73) ASSIGNEE

"Canon Kabushiki Kaishi, Tokyo (JP)" should read --Canon Kabushiki Kaisha, Tokyo (JP)--.

COLUMN 2

Line 21, "pe-blanking" should read --pre-blanking--; and  
Line 41, "ods." should read --od.--.

COLUMN 8

Line 44, "unit" should read --units--; and  
Line 58, "low-pas" should read --low-pass--.

COLUMN 12

Line 43, "and" should be deleted.

Signed and Sealed this

Second Day of September, 2008

JON W. DUDAS  
*Director of the United States Patent and Trademark Office*